United States Patent
Hoshida et al.

(10) Patent No.: US 7,630,650 B2
(45) Date of Patent: Dec. 8, 2009

(54) MULTI-LEVEL MODULATION RECEIVING DEVICE

(75) Inventors: Takeshi Hoshida, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 520 days.

(21) Appl. No.: 11/655,186

(22) Filed: Jan. 19, 2007

(65) Prior Publication Data
US 2008/0031633 A1    Feb. 7, 2008

(30) Foreign Application Priority Data
Jul. 31, 2006    (JP)    ............................. 2006-207597

(51) Int. Cl.
*H04B 10/12* (2006.01)
(52) U.S. Cl. .................. 398/183; 398/149; 398/154; 398/158; 398/192; 398/202; 398/185
(58) Field of Classification Search ............... 398/149, 398/154, 202, 158, 192; 375/229–234, 200
See application file for complete search history.

(56) References Cited

U.S. PATENT DOCUMENTS

| | | | | |
|---|---|---|---|---|
| 4,121,165 | A * | 10/1978 | Dogliotti et al. | 329/361 |
| 5,859,870 | A * | 1/1999 | Tsujimoto | 375/143 |
| 7,149,256 | B2 * | 12/2006 | Vrazel et al. | 375/295 |
| 7,573,966 | B2 * | 8/2009 | Kim et al. | 375/350 |
| 2003/0223762 | A1 * | 12/2003 | Ho et al. | 398/186 |
| 2004/0081470 | A1 | 4/2004 | Griffin | |
| 2007/0025737 | A1 * | 2/2007 | Kamio et al. | 398/150 |

FOREIGN PATENT DOCUMENTS

JP    2004-516743    6/2004

OTHER PUBLICATIONS

"Electrical Signal Processing Techniques in Long-Haul Fiber-Optic Systems", Jack H. Winters et al., IEEE Transactions on Communications, vol. 38, No. 9, Sep. 1990, pp. 1439-1453.
"An APD/FET Optical Receiver Operating at 8 Gbit/s", Journal of Lightwave Technology, vol. LT-5, No. 3, Mar. 1987, pp. 344-347.

* cited by examiner

*Primary Examiner*—Ken N Vanderpuye
*Assistant Examiner*—Hibret A Woldekidan
(74) *Attorney, Agent, or Firm*—Staas & Halsey LLP

(57) ABSTRACT

A multi-level modulation receiving device for adaptively compensating for chromatic dispersion and polarization mode dispersion with high precision. Each equalizing filter has at least one variable parameter as a weight therefor and equalizes the waveform of a corresponding channel signal in accordance with an averaged variable parameter value. A signal quality monitor monitors the signal quality of the filter output signal, and a variable parameter value calculator calculates a variable parameter value to be set as the variable parameter, in accordance with the signal quality. A variable parameter averaging unit averages the variable parameter values calculated for respective channels, to generate an averaged variable parameter value, and sends the averaged variable parameter value to the equalizing filters such that the same weight is set in the equalizing filters associated with the n channels.

8 Claims, 16 Drawing Sheets

| $\Delta\theta$ | DELAY INTERFEROMETER 60a ($+\pi/4$) | DELAY INTERFEROMETER 60b ($-\pi/4$) |
|---|---|---|
| 0 | + | + |
| $\pi/2$ | + | − |
| $\pi$ | − | − |
| $3\pi/2$ | − | + |

FIG. 9

MULTI-LEVEL MODULATION RECEIVING DEVICE

CROSS-REFERENCE TO RELATED APPLICATIONS

This application is based upon and claims the benefits of priority from the prior Japanese Patent Application No. 2006-207597 filed on Jul. 31, 2006, the entire contents of which are incorporated herein by reference.

BACKGROUND OF THE INVENTION

1. Field of the Invention

The present invention relates to multi-level modulation receiving devices, and more particularly, to a multi-level modulation receiving device for receiving a multi-level modulated optical signal.

2. Description of the Related Art

As a result of the recent growing tendency toward longer-distance, higher-capacity optical transmission, dispersion compensation technology for compensating for dispersion caused in optical fibers has become an indispensable technique. Optical transmission systems with transmission rates of the order of 10 Gbps generally employ a chromatic dispersion compensation method in which a dispersion compensating fiber (DCF) is incorporated in an optical amplifier-repeater which is arranged on the transmission line at regular intervals.

In the case of 10-Gbps optical transmission systems, the dispersion compensation method using DCFs can, in many cases, satisfactorily compensate for chromatic dispersion that varies with temperature and with time, to an extent such that the BER (Bit Error Rate) falls within an allowable range.

However, where higher-speed modulation is carried out to attain higher-speed optical transmission exceeding 10 Gbps, for example, 40-Gbps or faster optical transmission, chromatic dispersion exerts a more serious influence on signals than in the case of 10-Gbps optical transmission systems. Besides, the influence of polarization mode dispersion, which poses rather small problem in the case of 10-Gbps transmission, becomes significant.

Specifically, the influence of chromatic dispersion grows stronger in proportion to the square of the transmission rate, and therefore, the allowable range of chromatic dispersion at 40 Gbps is as narrow as $1/16$ (e.g., about 40 ps/nm or less) of the allowable range at 10 Gbps. On the other hand, the influence of polarization mode dispersion heightens in proportion to the transmission rate, and accordingly, the allowable range of polarization mode dispersion at 40 Gbps is as narrow as $1/4$ of the allowable range at 10 Gbps.

Thus, 40-Gbps high-speed optical transmission systems require higher-precision dispersion compensation techniques, and the key issue is how to suppress the waveform degradation caused by chromatic dispersion and polarization mode dispersion.

Chromatic dispersion is a phenomenon wherein different wavelength components in an optical signal have different propagation times. Generally, chromatic dispersion is expressed as a propagation time difference obtained when two monochromatic light beams with a wavelength difference of 1 nm are propagated over 1 km.

Polarization mode dispersion signifies a phenomenon wherein two orthogonal polarizations have different propagation constants because of slight birefringence caused in a transmission line constituted by an optical fiber or the like. In the case of an optical fiber, for example, polarization mode dispersion does not occur if the fiber core has a perfectly circular cross-section. However, in real optical fibers, birefringence is caused due to slight ellipticity or asymmetric stress. Polarization mode dispersion includes the first-order polarization mode dispersion and higher-order polarization mode dispersions.

A transmission line with birefringence exhibits slightly different refractive indices depending on the incident polarization, and an optical fiber transmission line equivalently possesses a slow axis (optical path with a large refractive index through which light travels at low speed) and a fast axis (optical path with a small refractive index through which light travels at high speed). A propagation time difference between the slow and fast axes is referred to as the first-order polarization mode dispersion. The amount of waveform distortion of an optical signal caused by the first-order polarization mode dispersion depends also on in what ratio light enters the slow and fast axes.

In the case of an optical fiber transmission line extending over a long distance, the two, slow and fast axes are not regarded as extending straight throughout the transmission line. Instead, such a long transmission line is modeled in a manner such that an interval with its own slow and fast axes and another interval with its own slow and fast axes are interconnected with a certain gradient. Thus, a long transmission line is a concatenation of a large number of intervals with their own slow and fast axes.

In such transmission lines, complex waveform degradation occurs as channels of different optical wavelengths undergo respective different slow and fast axes or even a single wavelength channel undergoes different slow and fast axes depending on the optical frequency component because the modulation spectrum contains high- and low-frequency components. These phenomena are called higher-order polarization mode dispersions.

Where the transmission distance is long, the first-order polarization mode dispersion sometimes accumulates up to about several picoseconds to ten-odd picoseconds. In 10-Gbps transmission, one timeslot is about 100 ps long, and therefore, in the case of 10-Gbps or slower optical transmission systems, a polarization mode dispersion of several picoseconds poses no significant problem since it falls within the allowable range. In 40-Gbps optical transmission, however, the length of one timeslot is $1/4$ of that of a timeslot for 10-Gbps transmission. Consequently, a polarization mode dispersion of several picoseconds to ten-odd picoseconds becomes a main cause of inter-symbol interference.

As conventional optical transmission techniques, there have been proposed multi-level modulation optical transmission techniques in which multi-level modulated optical signals are transmitted and received so as to suppress waveform degradation attributable to dispersion (e.g., PCT-based Unexamined Japanese Patent Publication No. 2004-516743 (paragraph nos. [0018] to [0037], FIG. 1); non-patent documents: "Electrical signal processing techniques in long-haul fiber-optic systems," IEEE Transactions on Communications, Vol. 38, No. 9, pp. 1439-1453, September 1990, and "An APD/FET optical receiver operating at 8 Gbit/s," Journal of Lightwave Technology, Vol. LT-5, No. 3, March 1987).

Meanwhile, optical networks are under study and development which employ a redundant configuration for optical fiber transmission lines and which have an optical protection switching function whereby, if an optical fiber transmission line develops a fault, switching to a standby path is executed.

In cases where optical signals are transmitted at 40 Gbps across such an optical network, the tolerance to chromatic dispersion at 40 Gbps is very narrow, as stated above. Accordingly, if there is even a slight difference of chromatic dispersion between current and standby optical fiber transmission lines, the dispersion difference becomes outside the dispersion tolerance range at the time of switching the optical fibers. Also, in the case of transmitting, for example, SDH (Synchronous Digital Hierarchy) signals over an optical network, it is necessary to meet the requirement that the time required until the SDH optical path switching should not exceed 50 ms.

In connection with the polarization mode dispersion, if the optical fiber transmission line is subjected to vibration (e.g., an aerial cable is vibrated by wind or a cable laid along a railroad track is vibrated due to the passage of a railroad car) or to physical external force or displacement (e.g., a person working in an office touches the transmission line), the polarization state of the optical signal propagated through the transmission line changes (light propagated through the slow axis until then is propagated through the fast axis or the optical branching ratio of the slow and fast axes varies), with the result that the waveform distortion varies with time.

Accordingly, to construct 40-Gbps redundant optical networks with the protection switching function, there has been a strong demand for adaptive, high-precision dispersion compensation techniques capable of remedying the waveform degradation caused by chromatic dispersion and polarization mode dispersion, while following the time-varying waveform degradation in a short time of several milliseconds or less.

SUMMARY OF THE INVENTION

The present invention was created in view of the above circumstances, and an object thereof is to provide a multi-level modulation receiving device capable of adaptively compensating for both chromatic dispersion and polarization mode dispersion with high precision while following time-varying waveform degradation in a short time.

To achieve the object, there is provided a multi-level modulation receiving device for receiving a multi-level modulated optical signal. The multi-level modulation receiving device comprises an optical splitter for receiving a multi-level modulated optical signal transmitted thereto via a transmission line, and splitting the multi-level modulated optical signal into n optical signals, equalizers associated with n channels, respectively, each of the equalizers including a demodulator for demodulating a corresponding channel of the split optical signal and converting the optical signal to an electrical channel signal, an equalizing filter having at least one variable parameter as a weight therefor, for equalizing waveform of the channel signal in accordance with an averaged variable parameter value, a discriminator for discriminating a waveform-equalized filter output signal output from the equalizing filter, a signal quality monitor for monitoring signal quality of the filter output signal, and a variable parameter value calculator for calculating a variable parameter value to be set as the variable parameter, in accordance with the signal quality, and a variable parameter averaging unit for averaging the variable parameter values calculated for the respective channels, to generate the averaged variable parameter value, and sending the averaged variable parameter value to the equalizing filters such that an identical weight is set in the equalizing filters associated with the n channels.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows the relationship between $\Delta\theta$ and the direction of current.

DESCRIPTION OF THE PREFERRED EMBODIMENTS

Figure 1:
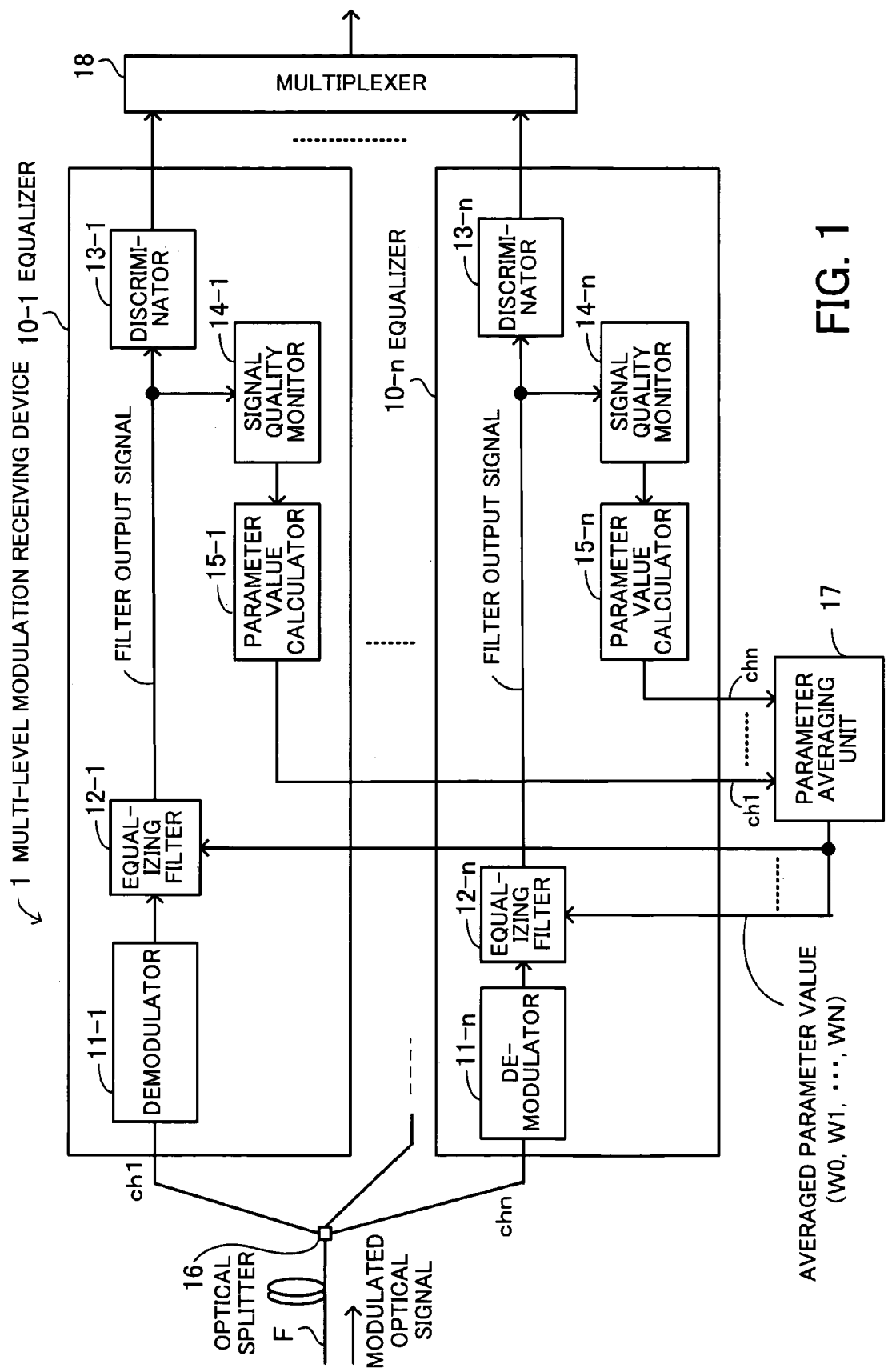
FIG. 1 illustrates the principle of a multi-level modulation receiving device.

Preferred embodiments of the present invention will be described below with reference to the accompanying drawings, wherein like reference numerals refer to like elements throughout. FIG. 1 illustrates the principle of a multi-level modulation receiving device. The multi-level modulation receiving device 1 receives and demodulates a multi-level modulated optical signal which has been subjected to multi-level modulation at the transmitting side and transmitted thereto via an optical fiber transmission line F.

The multi-level modulation receiving device 1 comprises an optical splitter 16, a variable parameter averaging unit 17, a multiplexer 18, and equalizers 10-1 to 10-$n$ associated with n channels. The equalizers 10-1 to 10-$n$ respectively include demodulators 11-1 to 11-$n$, equalizing filters 12-1 to 12-$n$, discriminators 13-1 to 13-$n$, signal quality monitors 14-1 to 14-$n$, and variable parameter value calculators 15-1 to 15-$n$.

The optical splitter 16 receives the multi-level modulated optical signal transmitted thereto through the optical fiber transmission line F and splits the received signal into n optical signals for the n channels (n splitting). The demodulators 11-1 to 11-$n$ each demodulate a corresponding channel of the split optical signal and convert the optical signal to an electrical channel signal.

The equalizing filters 12-1 to 12-$n$ each have at least one variable parameter (tap coefficient) as a weight therefor, and equalize the waveform of the corresponding channel signal in accordance with an averaged variable parameter value (W0, W1, ..., WN) supplied from the variable parameter averaging unit 17. The discriminators 13-1 to 13-*n* discriminate the states of the respective waveform-equalized signals output from the equalizing filters 12-1 to 12-*n* and generate discriminative signals. The multiplexer 18 multiplexes the discriminative signals of the n channels.

The signal quality monitors 14-1 to 14-*n* each monitor the quality of the corresponding filter output signal. The variable parameter value calculators 15-1 to 15-*n* each calculate a variable parameter value to be set as the variable parameter, in accordance with the corresponding signal quality.

The variable parameter averaging unit 17 averages the variable parameter values calculated for the respective channels, to generate an averaged variable parameter value (W0, W1, . . . , WN), which is supplied to the equalizing filters 12-1 to 12-*n* so that the same weight (variable parameter) may be set in all equalizing filters 12-1 to 12-*n* associated with the n channels (in the following description, the variable parameter is referred to also as the weight).

Before proceeding to detailed explanation of the configuration and operation of the multi-level modulation receiving device 1, the configuration and operation of an RZ-DQPSK (Return to Zero-Differential Quadrature Phase Shift Keying) system for performing DQPSK optical transmission, on which the multi-level modulation receiving device 1 can be based, will be explained.

Figure 2:
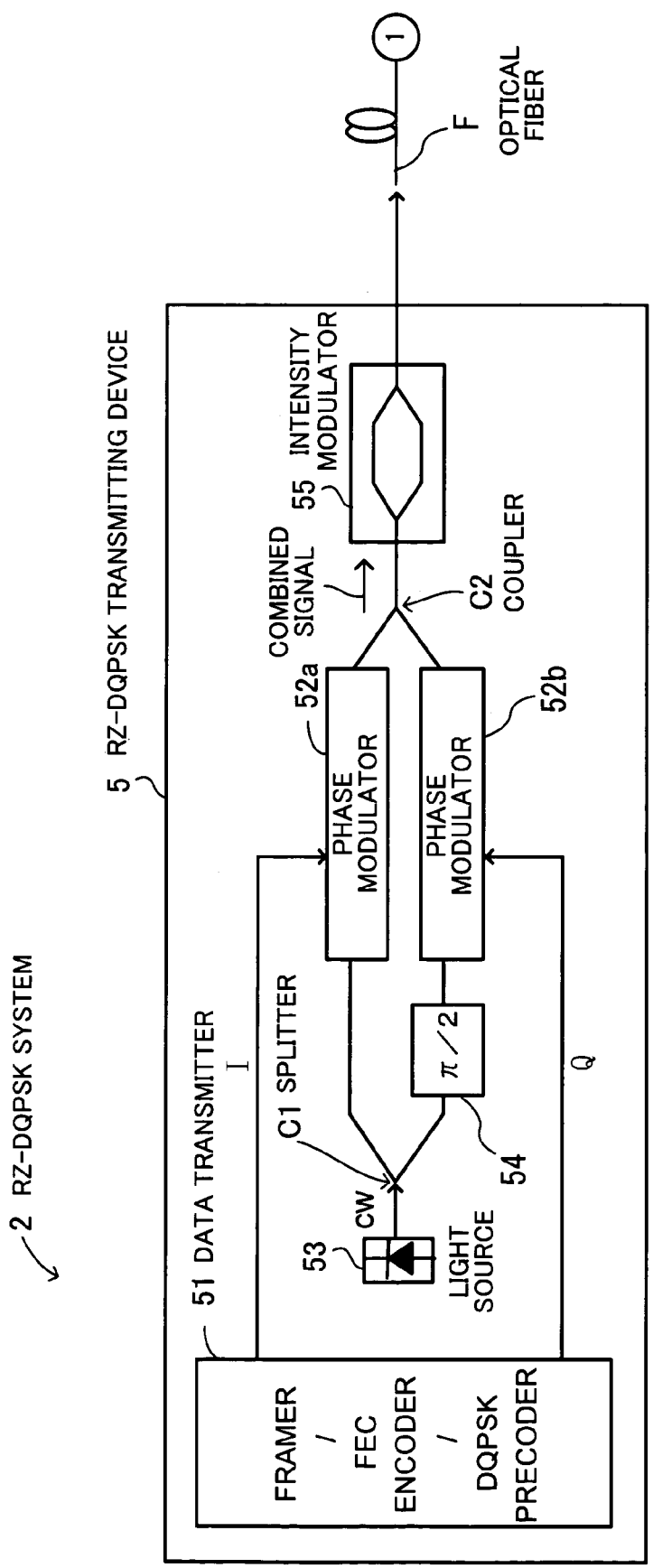
FIG. 2 shows the configuration of an RZ-DQPSK transmitting device.
Figure 3:
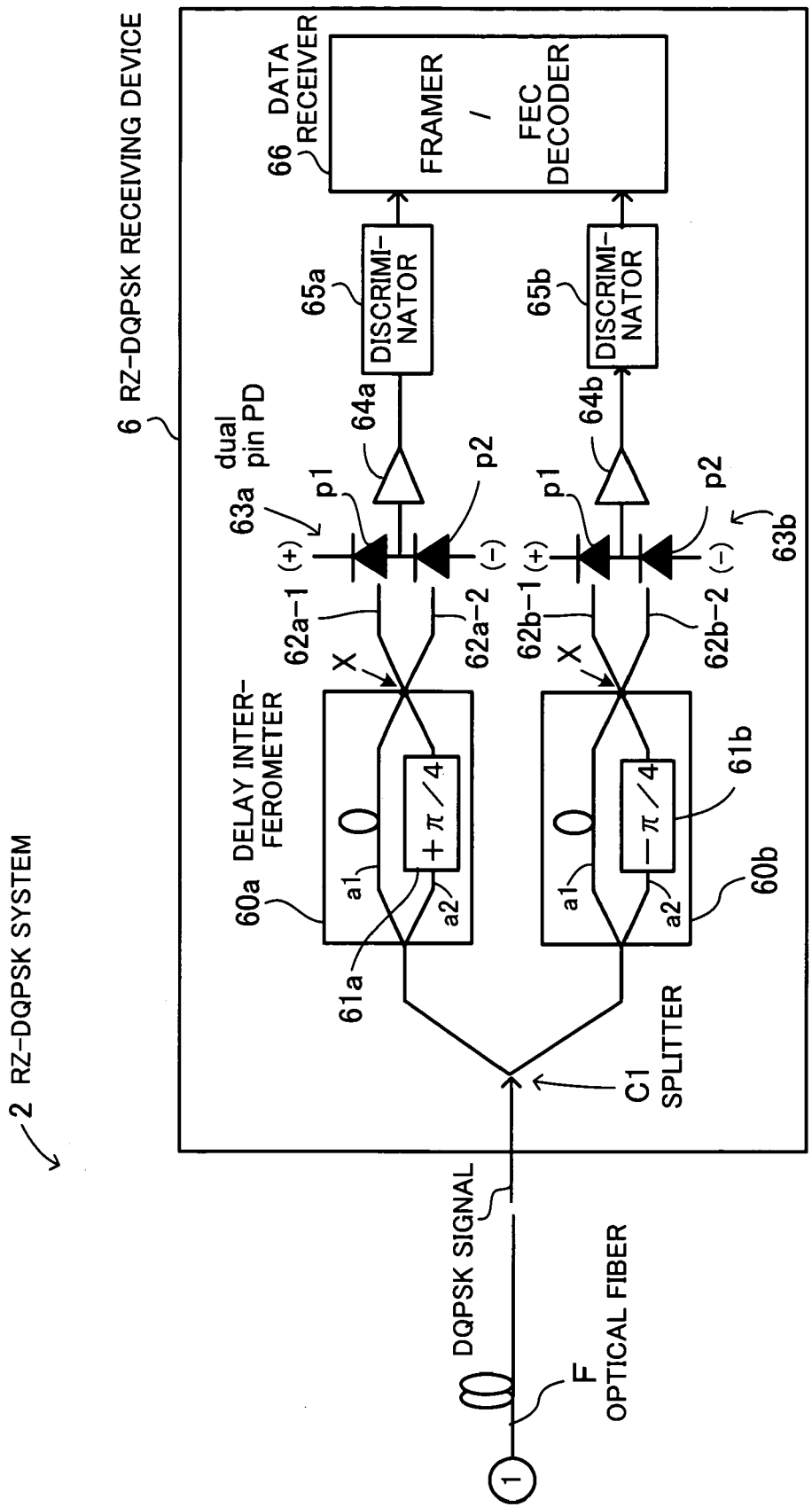
FIG. 3 shows the configuration of an RZ-DQPSK receiving device.

FIGS. 2 and 3 illustrate the configuration of such an RZ-DQPSK system, wherein FIG. 2 shows an RZ-DQPSK transmitting device 5 and FIG. 3 shows an RZ-DQPSK receiving device 6. The RZ-DQPSK system 2 is constituted by the RZ-DQPSK transmitting device 5 and the RZ-DQPSK receiving device 6 interconnected by an optical fiber transmission line F. Optical amplifier-repeaters, WDM (Wavelength Division Multiplexing) multiplexers and demultiplexers, wavelength cross-connects, etc. are often provided on the optical fiber transmission line F but are omitted from the figures.

As shown in FIG. 2, the RZ-DQPSK transmitting device 5 comprises a data transmitter 51, phase modulators 52*a* and 52*b*, a light source 53, a splitter C1, a coupler C2, a π/2 phase shifter 54, and an RZ pulsation intensity modulator 55. The transmitting device carries out two independent optical phase modulations at 20 Gbps (in the following, Gbps is also expressed merely as G) and outputs an optical signal with an information content of 40 G to the optical fiber transmission line F.

The data transmitter 51 outputs two channel signals, that is, a 20-G I signal input to the phase modulator 52*a* and a 20-G Q signal input to the phase modulator 52*b*. The data transmitter 51 may include, as its built-in functions, a framer for performing framing process according to OTN (Optical Transport Network) or SDH (Synchronous Digital Hierarchy) or SONET (Synchronous Optical Network), an FEC (Forward Error Correction) encoder, a DQPSK precoder, etc., for example.

The light source 53 emits continuous light, and the splitter C1 splits the continuous light into two, one being input to the phase modulator 52*a* and the other to the π/2 phase shifter 54. The π/2 phase shifter 54 shifts the phase of the electric field of the light by π/2, and the phase-shifted light is input to the phase modulator 52*b*. The π/2 phase shifter 54 and the phase modulator 52*b* may alternatively be reversed in order, and also the amount of phase shifted by the π/2 phase shifter 54 may be −π/2.

The phase modulator 52*a* changes the phase of the input light in a manner corresponding to the 0s and 1s of the I signal, and the phase modulator 52*b* changes the phase of the π/2-shifted input light in a manner corresponding to the 0s and 1s of the Q signal. (Where the π/2 phase shifter 54 and the phase modulator 52*b* are reversed in order, the phase of the light is first changed so as to correspond to the 0s and 1s of the Q signal and then shifted by π/2.) The coupler C2 combines the outputs of the phase modulators 52*a* and 52*b* to generate a combined signal.

In this manner, separate phase modulations are performed using the I and Q signals, respectively, and the phase-modulated components are combined together with the phase of the electric field of the light shifted by π/2, thereby carrying out 4-level quadrature phase shift keying (QPSK).

The RZ pulsation intensity modulator 55 has a 20-GHz clock source (not shown) as a signal source for modulation, and repeatedly modulates the intensity of the 20-GHz clock signal in accordance with the phase-modulated combined signal, to shape the waveform of the combined signal into a waveform consisting of an RZ pulse train. The resulting one-wavelength 40-G optical signal, which has been shaped into an RZ pulse train, is output to the optical fiber transmission line F.

Figure 4:
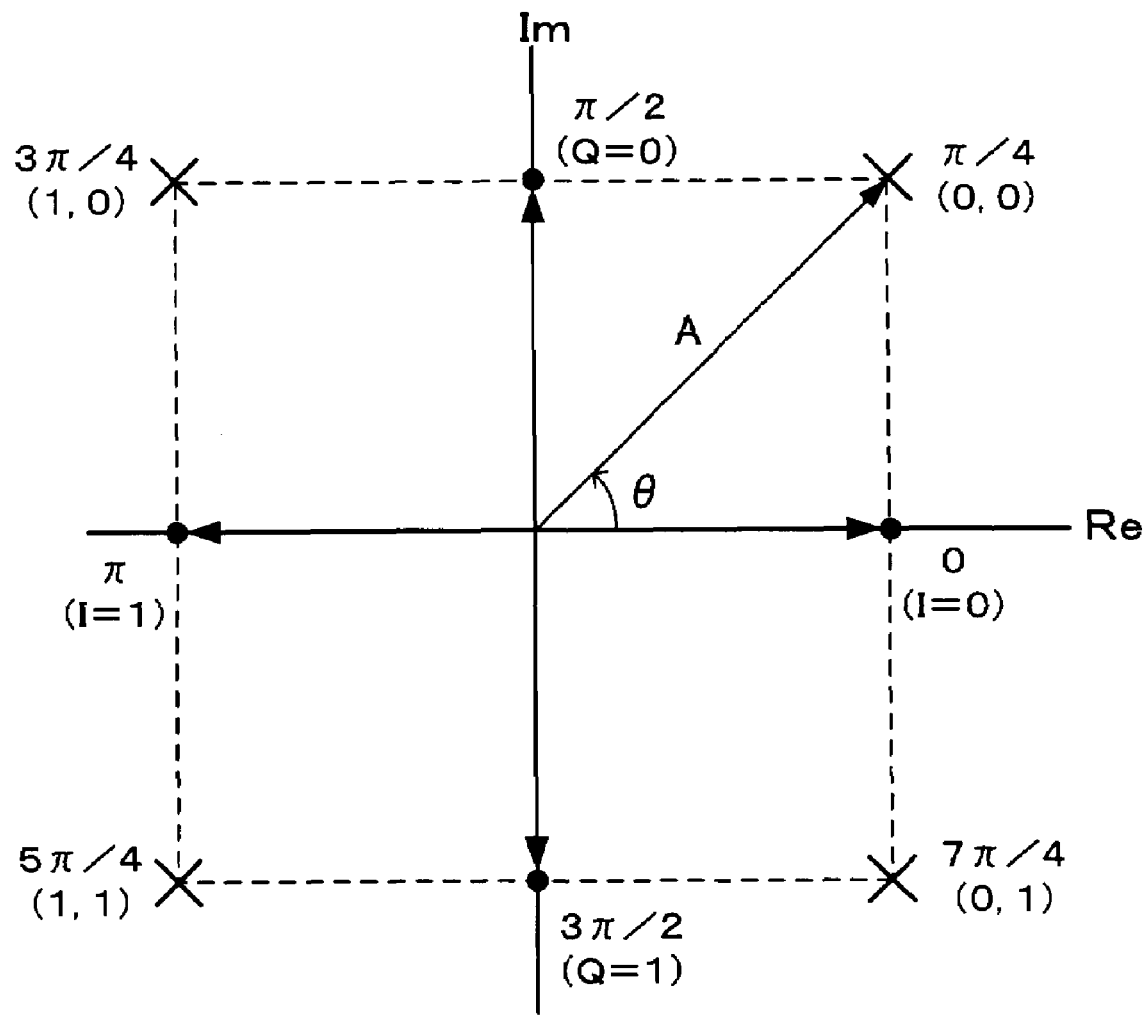
FIG. 4 is a phase diagram illustrating QPSK.

FIG. 4 is a phase diagram illustrating QPSK, wherein the horizontal axis indicates real part Re and the vertical axis indicates imaginary part Im. Provided that the amplitude of the electric field of light is A(t) and the function representing the oscillation of the electric field is exp(j(ωt−θ(t))), the time function E(t) of the electric field is expressed by equation (1a) below, which can be expanded as shown in equation (1b).

$$E(t) = A(t) \cdot e^{j(\omega t - \theta(t))} \qquad (1a)$$

$$= A(t) \cdot e^{-j\theta(t)} \cdot e^{j\omega t} \qquad (1b)$$

The phase diagram of FIG. 4 shows the part A(t)·exp(−jθ(t)) in equation (1b) plotted on the complex plane.

As the phase modulator 52*a* modulates light in accordance with the I signal, the modulated signal assumes either 0 (I=0) or π (I=1) on the real axis in the phase diagram of FIG. 4. As the phase modulator 52*b* modulates light in accordance with the Q signal, on the other hand, the modulated signal assumes either π/2 (Q=0) or 3π/2 (Q=1) on the imaginary axis, because it is rotated by π/2 with respect to the I signal.

Combining these modulated signals by the coupler C2 means performing additions along the orthogonal real and imaginary axes in the phase diagram, and therefore, the resultant optical signal (combined signal) assumes one of the four phase states π/4 (0, 0), 3π/4 (1, 0), 5π/4 (1, 1) and 7π/4 (0, 1) (every adjacent phases are orthogonal).

Figure 5:
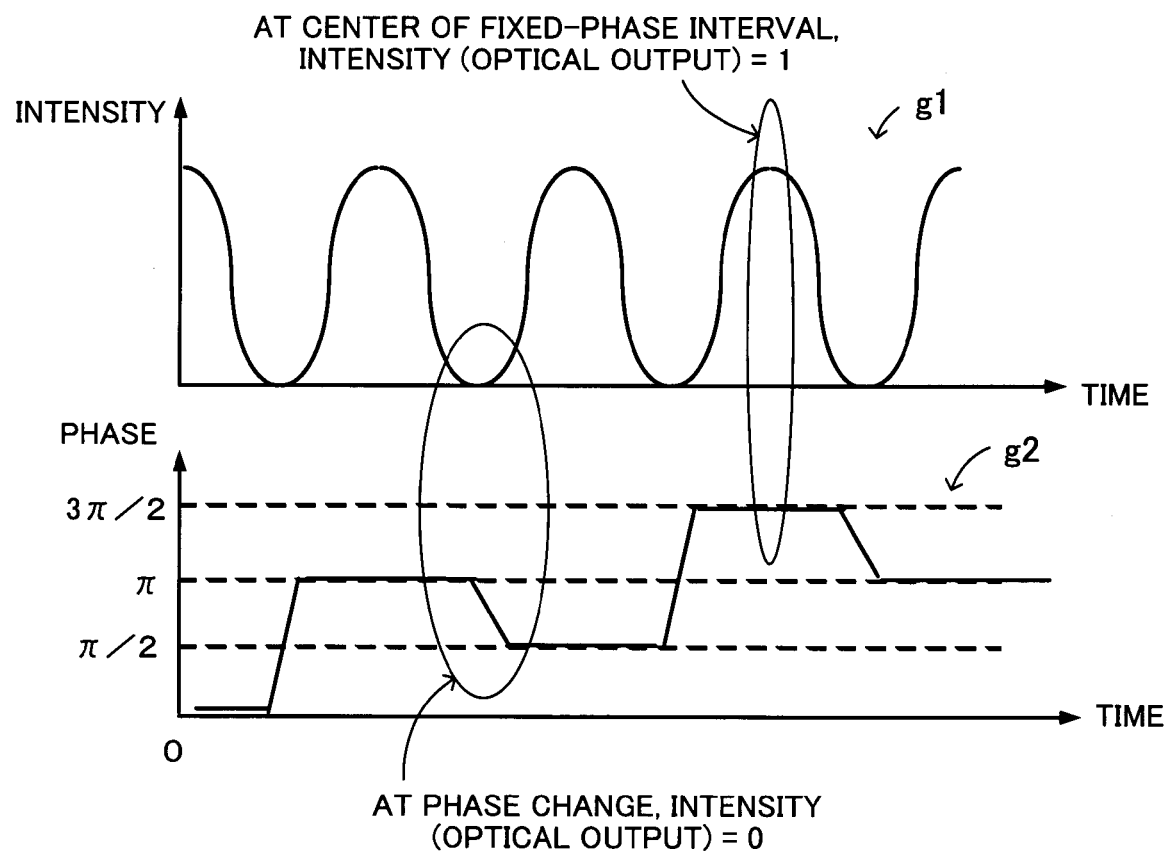
FIG. 5 illustrates the operation of an RZ pulsation intensity modulator.

FIG. 5 illustrates the operation of the RZ pulsation intensity modulator 55. Graph g1 shows light intensity pulses of the RZ pulsation intensity modulator 55, wherein the horizontal axis indicates time and the vertical axis indicates intensity, and graph g2 shows the time-varying phase of the combined signal, wherein the horizontal axis indicates time and the vertical axis indicates phase.

The RZ pulsation intensity modulator 55 shapes the waveform of the combined signal into RZ pulses in the manner described below. When the phase of the combined signal changes, the RZ pulsation intensity modulator extinguishes light (optical output=0) such that the bottom of the intensity pulse coincides with the moment of phase change, and when the phase of the combined signal is fixed, the intensity modulator intensifies the output (optical output=1) such that the peak of the intensity pulse coincides with the center of the symbol of the combined signal.

Phase-modulated data can be transmitted even if the transmitting device does not include the RZ pulsation intensity modulator 55 as its component. By converting the phase-modulated signal into an RZ pattern to be input the optical fiber transmission line F, however, it is possible to reduce distortion attributable to the nonlinear effect of optical signal on the optical fiber transmission line F.

Referring now to FIG. 3, the RZ-DQPSK receiving device 6 will be explained. The RZ-DQPSK receiving device 6 comprises a splitter C1, delay interferometers 60a and 60b, dual pin photodiodes (PDs) 63a and 63b, preamplifiers 64a and 64b, discriminators 65a and 65b and a data receiver 66, and receives and demodulates the 40-G optical modulated signal.

The splitter C1 splits the received one-wavelength optical signal into two channels, and the thus-split optical signals are output to the respective delay interferometers 60a and 60b. The delay interferometers 60a and 60b are Mach-Zehnder interferometers which are associated with the respective two separate channels and convert the phase-modulated data in the optical signal to intensity-modulated data independently of each other.

The delay interferometer 60a has two waveguides (arms) a1 and a2. One of the arms, namely, the arm a2 is provided with a $\pi/4$ phase shifter 61a, and the refractive index of this waveguide is finely controlled by an interferometer controller, not shown, so that the optical phase difference between the arms may be $\pi/4$ at an interference point X. The waveguide of the arm a1, which is not provided with a phase shifter, has a greater optical path length such that the optical signal propagated therethrough is delayed for a time approximately equal to the time needed to code one symbol, with respect to the optical signal propagated through the arm a2.

Consequently, a currently received symbol which has been propagated through the optical path of the arm a2 and shifted in phase by $\pi/4$ and the immediately preceding symbol which has been propagated through the optical path of the arm a1 are made to interfere with each other at the interference point X. The delay interferometer 60b differs from the delay interferometer 60a in that one of two arms thereof, namely, the arm a2 is provided with a $-\pi/4$ phase shifter 61b, and a basic operation thereof is identical with that of the delay interferometer 60a.

Also, the delay interferometers 60a and 60b each have two output arms for outputting the interference value derived at the corresponding interference point X, that is, upper and lower output arms 62a-1 and 62a-2 and upper and lower output arms 62b-1 and 62b-2. The output values of the upper output arms 62a-1 and 62b-1 and the output values of the lower output arms 62a-2 and 62b-2 are respectively in a complementary relationship. For example, when the output value of the upper output arm 62a-1 is "+a", the output value of the lower output arm 62a-2 is "−a".

The dual pin photodiodes (differential photodiodes) 63a and 63b serve as O/E converters and each comprise a direct photodetector for directly detecting the intensity-modulated optical signal and converting the detected light intensity directly to an electric current signal. Each of the dual pin photodiodes 63a and 63b includes two photodiodes p1 and p2 connected to each other and is configured such that the output thereof appears at the node of the two photodiodes.

The upper photodiode p1 has a cathode applied with a positive bias voltage and has an anode connected to the cathode of the lower photodiode p2. The anode of the lower photodiode p2 is applied with a negative bias voltage. The upper output arms 62a-1 and 62b-1 of the delay interferometers 60a and 60b are connected to the respective upper photodiodes p1 of the dual pin photodiodes 63a and 63b, and the lower output arms 62a-2 and 62b-2 are connected to the respective lower photodiodes p2 of the dual pin photodiodes 63a and 63b.

The discriminators 65a and 65b, which each have clock recovery function and threshold-based binary discrimination function, carry out clock recovery and threshold-based binary discrimination with respect to signals which have been subjected to current-voltage conversion by the preamplifiers 64a and 64b, to generate digital signals.

The data receiver 66 receives the 20-Gbps digital signal output from the discriminator 65a as well as the 20-Gbps digital signal output from the discriminator 65b, and performs a predetermined data reception process. At this time, the 20-G digital signals of the two channels may be serially multiplexed to obtain a 40-G digital signal as an output signal. Also, the data receiver 66 may include, as its built-in functions, a framer for performing framing process according to OTN or SDH or SONET, an FEC decoder, etc.

Figure 6:
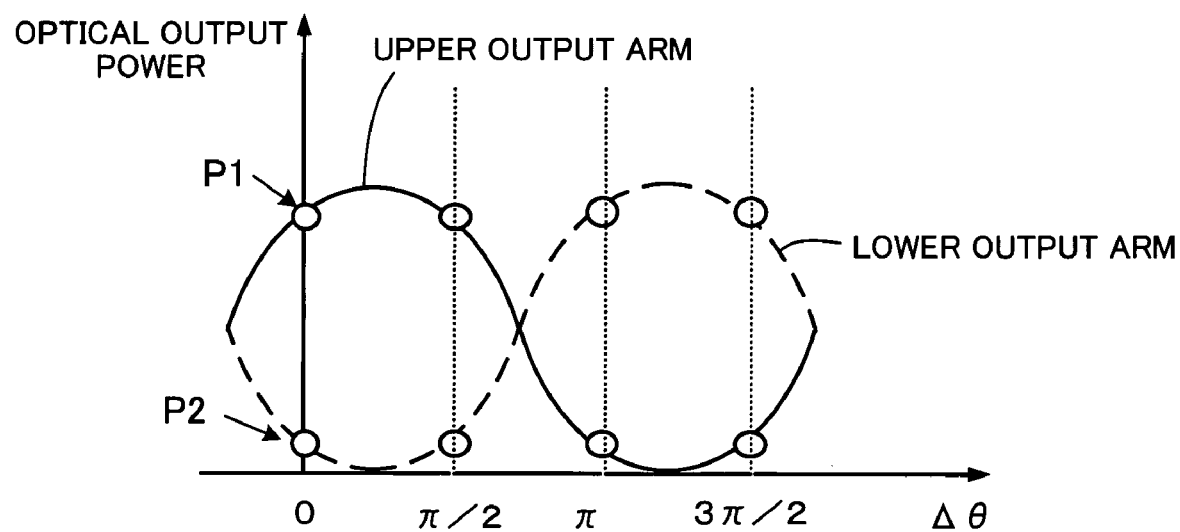
FIG. 6 shows the transmittance of a delay interferometer.
Figure 7:
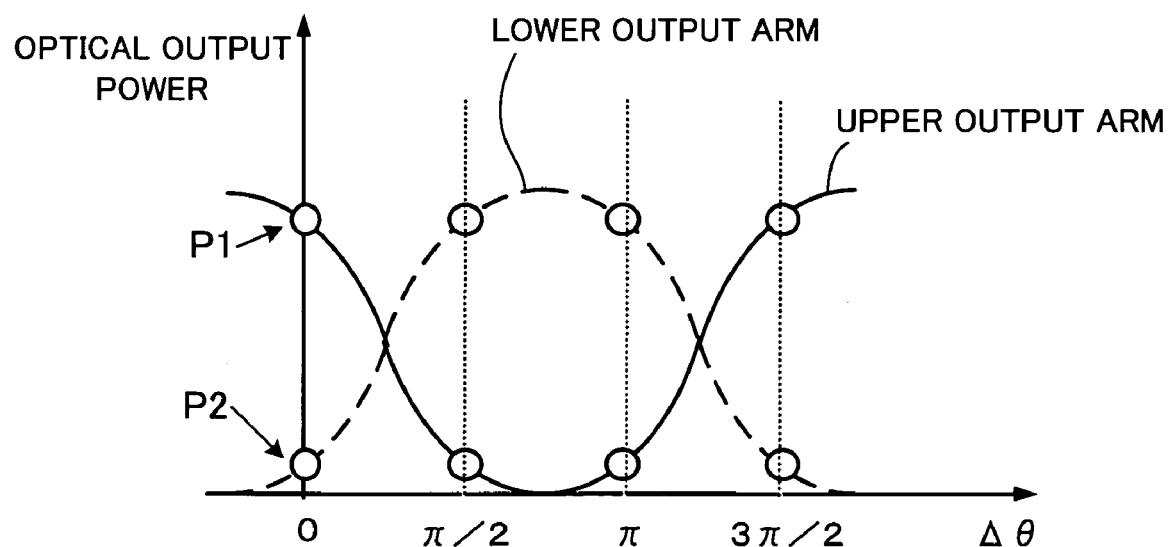
FIG. 7 shows the transmittance of another delay interferometer.

Referring now to FIGS. 6 to 9, QPSK demodulation will be explained in detail. FIGS. 6 and 7 show the transmittances of the delay interferometers 60a and 60b, respectively, wherein the horizontal axis indicates the phase difference $\Delta\theta$ between ith and (i−1)th symbols, and the vertical axis indicates the optical output power of the delay interferometer 60a, 60b. In the figures, the optical output power of the upper output arm 62a-1, 62b-1 is indicated by the solid line, and the optical output power of the lower output arm 62a-2, 62b-2 is indicated by the dashed line.

Each of the delay interferometers 60a and 60b causes a currently received symbol, of which the phase has been shifted by $\pi/4$, and the immediately preceding symbol to interfere with each other. Accordingly, $\Delta\theta$ where the interference at the interference point X becomes a maximum or a minimum is $-\pi/4$.

As seen from the transmittance of the delay interferometer 60a shown in FIG. 6, when the inter-symbol phase difference $\Delta\theta$ is equal to zero, the upper output arm 62a-1 provides an optical output P1, and also when $\Delta\theta=\pi/2$, the optical output of the upper output arm 62a-1 is at P1. Thus, when $\Delta\theta=0$ and when $\Delta\theta=\pi/2$, the upper output arm provides a relatively intensifying optical output (the interferometer is configured with its output phase shifted by $\pi/4$ from zero so that the optical output value may be the same when $\Delta\theta=0$ and when $\Delta\theta=\pi/2$). When $\Delta\theta=\pi$ and when $\Delta\theta=3\pi/2$, the upper output arm 62a-1 provides an optical output P2, which is a relatively weakening optical output (since the interferometer is configured with its output phase shifted by $\pi/4$ from zero, the optical output value is the same when $\Delta\theta=\pi$ and when $\Delta\theta=3\pi/2$).

On the other hand, the optical output of the lower output arm 62a-2 has complementary relation to the optical output of the upper output arm 62a-1 (thus, for every phase difference $\Delta\theta$, the sum of the optical outputs of the upper and lower output arms 62a-1 and 62a-2 remains constant). Specifically, the lower output arm 62a-2 provides the relatively weakening optical output P2 when $\Delta\theta=0$ and when $\Delta\theta=\pi/2$, and provides the relatively intensifying optical output P1 when $\Delta\theta=\pi$ and when $\Delta\theta=3\pi/2$.

The upper output arm 62a-1 is connected to the upper photodiode p1 of the dual pin photodiode 63a, and the lower output arm 62a-2 is connected to the lower photodiode p2 of same. Accordingly, more current flows through the upper photodiode p1 when $\Delta\theta=0$ and when $\Delta\theta=\pi/2$, and more current flows through the lower photodiode p2 when $\Delta\theta=\pi$ and when $\Delta\theta=3\pi/2$.

Figure 8A:
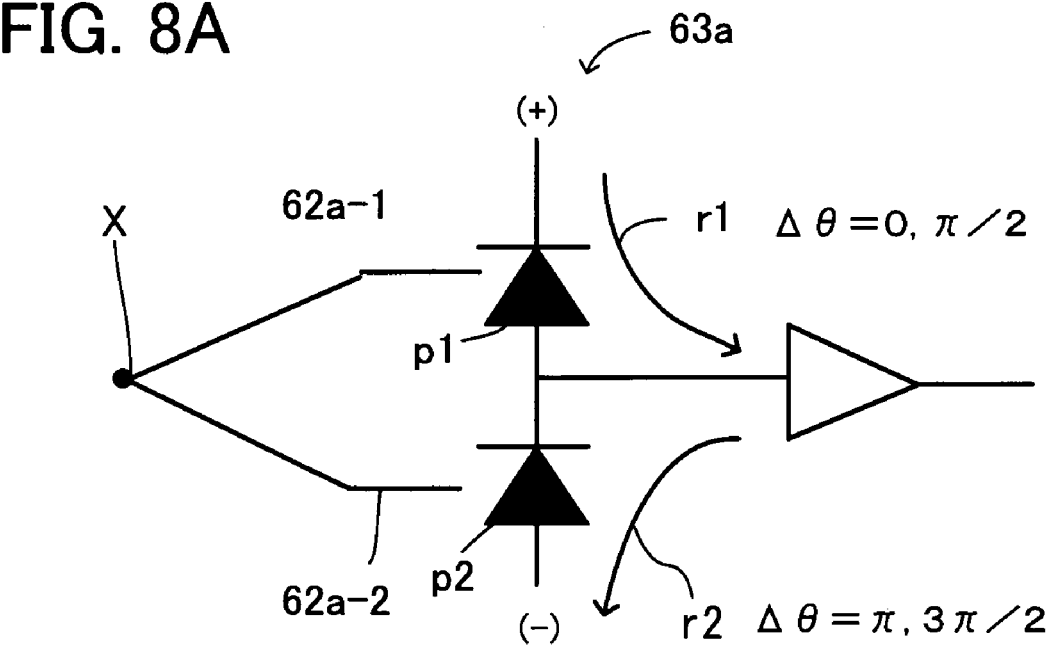
FIGS. 8A and 8B each show the direction of current flowing through a dual pin PD.
Figure 8B:
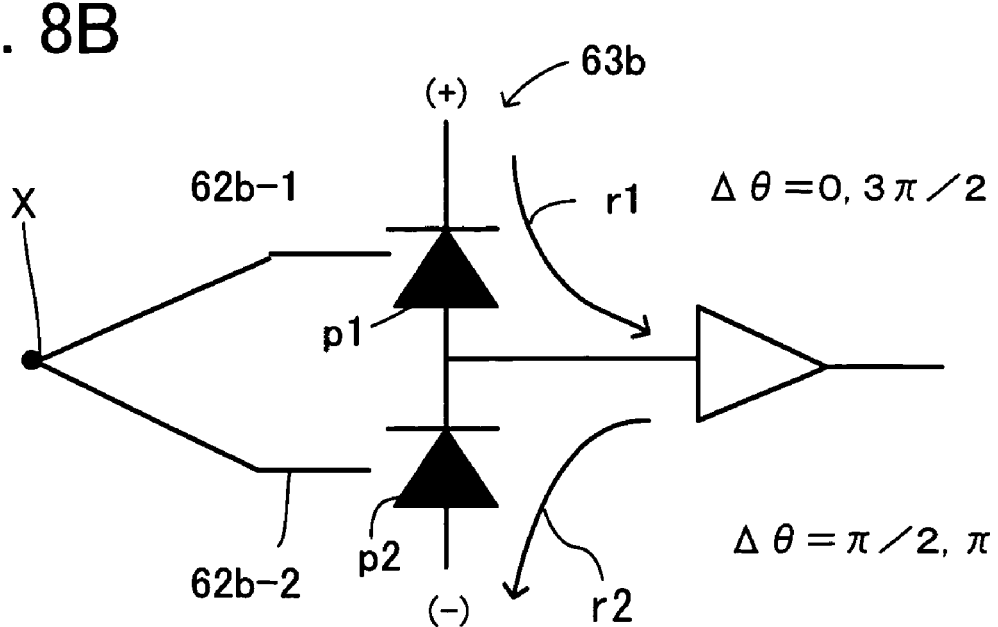

FIGS. 8A and 8B show the directions of currents flowing through the dual pin photodiodes 63a and 63b, respectively.

In the dual pin photodiode 63a shown in FIG. 8A, when more current flows through the upper photodiode p1, the output current of the dual pin photodiode 63a flows in the direction indicated by arrow r1 (positive output current), and when more current flows through the lower photodiode p2, the output current of the dual pin photodiode 63a flows in the direction indicated by arrow r2 (negative output current).

Referring now to FIG. 7 showing the transmittance of the delay interferometer 60b, when the inter-symbol phase difference $\Delta\theta$ is equal to zero or $3\pi/2$, the upper output arm 62b-1 provides the relatively intensifying optical output P1, and when the phase difference $\Delta\theta$ is equal to $\pi/2$ or $\pi$, the upper output arm 62b-1 provides the relatively weakening optical output P2.

The lower output arm 62b-2 provides the relatively weakening optical output P2 when $\Delta\theta$ is equal to zero or $3\pi/2$, and provides the relatively intensifying optical output P1 when $\Delta\theta$ is equal to $\pi/2$ or $\pi$.

Thus, when $\Delta\theta$ is equal to zero or $3\pi/2$, more current flows through the upper photodiode p1, and when $\Delta\theta$ is equal to $\pi/2$ or $\pi$, more current flows through the lower photodiode p2. When more current flows through the upper photodiode p1, the output current of the dual pin photodiode 63b flows in the direction indicated by arrow r1 (positive output current) in FIG. 8B, and when more current flows through the lower photodiode p2, the output current of the dual pin photodiode 63b flows in the direction indicated by arrow r2 (negative output current).

FIG. 9 shows the relationship between $\Delta\theta$ and the direction of current. In the case of the delay interferometer 60a, when $\Delta\theta$ is equal to zero or $\pi/2$, the output current of the dual pin photodiode 63a is a positive current and thus is indicated by "+" in the figure. When $\Delta\theta$ is equal to $\pi$ or $3\pi/2$, the output current of the dual pin photodiode 63a is a negative current and thus is indicated by "−".

Similarly, in the case of the delay interferometer 60b, when $\Delta\theta$ is equal to zero or $3\pi/2$, the output current of the dual pin photodiode 63b is a positive current and thus is indicated by "+" in FIG. 9, and when $\Delta\theta$ is equal to $\pi/2$ or $\pi$, the output current of the dual pin photodiode 63b is a negative current and thus is indicated by "−".

The transmitting side sends one of four different values with a phase difference of $\pi/2$, and therefore, the receiving side detects one of four different states as the phase difference between a currently received symbol and the immediately preceding symbol. When the phase is not rotated, $\Delta\theta=0$, and as the phase rotates in the counterclockwise direction successively by one step at a time, $\Delta\theta$ changes to $\pi/2$, then $\pi$, and $3\pi/2$. Each dual pin photodiode outputs one of two different currents, + or −, depending on by what degrees the phases of the current and preceding symbols are rotated relative to each other.

Thus, the delay interferometer 60a and the dual pin photodiode 63a extract two states from the four-level phase modulated data (half (20 G) of the transmitted 40-G information is extracted), and the other delay interferometer 60b and the dual pin photodiode 63b extract the other two states from the four-level phase modulated data.

Consequently, the two sets of elements, namely, one set composed of the delay interferometer 60a and the dual pin photodiode 63a and the other set composed of the delay interferometer 60b and the dual pin photodiode 63b, recover four states (+, +), (+, −), (−, −) and (−, +) as the combinations of + and −. As a subsequent process, the positive/negative current signals are converted to respective voltage signals, and the discriminators 65a and 65b discriminate between the bits 0 and 1 of the respective voltage signals by using a threshold, to generate digital signals.

Thus, the RZ-DQPSK receiving device 6 carries out RZ-DQPSK reception process by using two series of circuitry with nearly identical configuration for demodulation, whereby the circuit configuration can be simplified.

Figure 10:
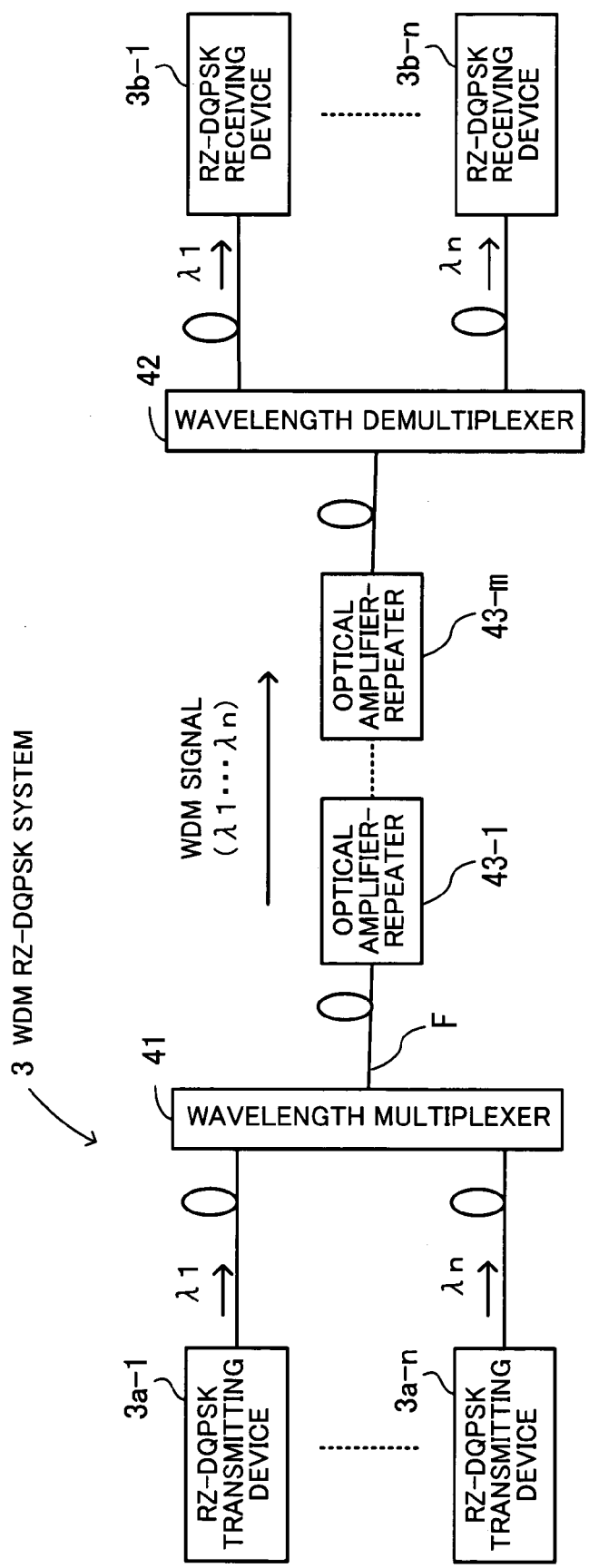
FIG. 10 schematically shows the configuration of a WDM RZ-DQPSK system.

The following describes the configuration wherein the RZ-DQPSK system 2 is applied to WDM transmission. FIG. 10 schematically shows the configuration of a WDM RZ-DQPSK system. The WDM RZ-DQPSK system 3 is a system adapted to perform WDM transmission of n wavelengths $\lambda 1$ to $\lambda n$, and includes RZ-DQPSK transmitting devices 3a-1 to 3a-n and RZ-DQPSK receiving devices 3b-1 to 3b-n. A wavelength multiplexer 41, a wavelength demultiplexer 42 and optical amplifier-repeaters 43-1 to 43-m are arranged on an optical fiber transmission line F.

Optical signals with wavelengths $\lambda 1$ to $\lambda n$, which are output from the respective RZ-DQPSK transmitting devices 3a-1 to 3a-n, are subjected to wavelength multiplexing by the wavelength multiplexer 41, to obtain a WDM signal. The WDM signal travels through the optical fiber transmission line F while being amplified and relayed by the optical amplifier-repeaters 43-1 to 43-m. The wavelength demultiplexer 42 receives the WDM signal and demultiplexes same into n optical signals of the respective wavelengths $\lambda 1$ to $\lambda n$, which are input to the corresponding RZ-DQPSK receiving devices 3b-1 to 3b-n.

As explained above, where an information content of 40 G is transmitted by the optical transmission scheme adopted in the RZ-DQPSK system 2, the light intensity has only to be switched at a rate of 20 GHz, since two bits can be transmitted by one symbol. Thus, compared with the optical transmission scheme in which one symbol carries one bit and the light intensity needs to be switched at a rate of 40 G per second, the modulation rate can be lowered, making it possible to reduce the waveform degradation attributable to chromatic dispersion and polarization mode dispersion. However, since the modulation rate of the RZ-DQPSK system 2 is still high, as compared with the case of 10-G optical transmission, the waveform distortion attributable to chromatic dispersion and polarization mode dispersion is more conspicuous than that caused during the 10-G optical transmission, requiring more precise dispersion compensation. Accordingly, the present invention provides a multi-level modulation receiving device which is further improved in regard to processing time, compensation precision, etc. and capable of adaptive, high-precision dispersion compensation.

The operation of the individual elements constituting the multi-level modulation receiving device 1 shown in FIG. 1 will be now described in detail. The multi-level modulated optical signal input via the optical fiber transmission line F is split by the optical splitter 16 into n signals to be distributed to the n channels. The demodulators 11-1 to 11-n convert the respective multi-level modulated optical signals distributed thereto to electrical signals. Each of the demodulators 11-1 to 11-n may be constructed using the combination of a delay interferometer and a differential photodiode, the combination of a local light source and an optical phase hybrid circuit and a differential photodiode, the combination of a photodiode and a nonlinear or linear amplifier circuit, etc.

The equalizing filters 12-1 to 12-n associated with the respective channels each have at least one variable parameter (weight) and are designed such that the transfer function thereof varies in accordance with the variable parameter set value. By suitably setting the variable parameter value, it is possible to compensate for and thereby reduce the inter-symbol interference of the received optical signal.

Namely, the equalizing filters 12-1 to 12-n perform filtering with their weights suitably set, to remedy waveform distortions of the filter output signals to be output to the respective discriminators 13-1 to 13-n, thereby broadening the margin (expanding the eye pattern) relative to the threshold of the discriminators 13-1 to 13-n and lowering the bit error rate. Also, even if the waveform distortion varies with time, the dispersion compensation can be made to follow the variation by adjusting the weights of the filters (i.e., electronic dispersion compensation (EDC) is carried out following the O/E conversion).

The equalizing filters 12-1 to 12-n may each be constructed using a linear analog filter (transversal filer or feedforward equalizer (FFE)) having a finite impulse response (FIR) characteristic, or a digital filter using the combination of a decision feedback filter (decision feedback equalizer (DFE)) adapted to feed back an analog decision result from a discrimination circuit, an analog/digital (A/D) converter and a digital signal processor. Also, these elements may be used in combination by connecting the elements in a cascaded fashion, for example. The electrical signals whose waveforms have been shaped by the equalizing filters 12-1 to 12-n are input to the discriminators 13-1 to 13-n and the signal quality monitors 14-1 to 14-n, respectively.

Where the inputs to the signal quality monitors 14-1 to 14-n are analog signals, for example, each signal quality monitor may be provided with a discrimination circuit and the difference between the discrimination result and the input analog value may be regarded as the quality of the analog signal.

Alternatively, a plurality of discrimination circuits may be provided for the input of each analog signal, and in accordance with the result of discrimination by a first discrimination circuit, the threshold of a second discrimination circuit may be varied so that the signal quality may be estimated from the combination of multiple discrimination results (the discrimination circuit may be shared by the signal quality monitor and its corresponding discriminator).

On the other hand, where the outputs of the equalizing filters 12-1 to 12-n are digital signals, each of the signal quality monitors 14-1 to 14-n may be provided with a forward error correction (FEC) circuit so that the detected number of symbol errors can be used as the signal quality.

In accordance with the outputs of the signal quality monitors, the respective variable parameter value calculators 15-1 to 15-n calculate values to be set as the variable parameter for the equalizing filters 12-1 to 12-n.

Where transversal filters or decision feedback filters are used as the equalizing filters, for example, a plurality of weights are set with respect to one filter, and in this case, the least mean square error algorithm or the zero-forcing algorithm may be used as the weight calculation algorithm. In the case of using digital filters, maximum likelihood sequence estimation (MLSE) using the Viterbi algorithm may be adopted.

One important feature of the multi-level modulation receiving device 1 resides in that the inter-symbol interference induced by chromatic dispersion or polarization mode dispersion as a result of the signal propagation over the optical fiber transmission line F occurs as the electrical waveforms output from all demodulators 11-1 to 11-n in the receiving device 1 undergo a common transfer function.

Namely, to compensate for the inter-symbol interference attributable to chromatic dispersion or polarization mode dispersion, the same variable parameter value may be set for all of the equalizing filters 12-1 to 12-n.

Therefore, the variable parameter averaging unit 17 of the multi-level modulation receiving device 1 averages the results obtained by the variable parameter value calculators 15-1 to 15-n, and sets the obtained variable parameter value in all equalizing filters 12-1 to 12-n.

In this manner, the variable parameter values obtained with respect to all receiving channels are averaged and the average obtained is given, as the weight, to all equalizing filters 12-1 to 12-n, whereby the dispersion compensation can be made to quickly follow the variation in waveform distortion.

By averaging the variable parameter values and using the average obtained for all filters, it is possible to make the variable parameter quickly converge at the start of the device. Also, the dispersion compensation can be made to quickly follow changes in chromatic dispersion and polarization mode dispersion caused on the optical fiber transmission line F, and the occurrence of errors in the steady state can be lessened.

Generally, the discriminators 13-1 to 13-n are arranged at the output stage of the equalizers 10-1 to 10-n and are provided with clock data recovery (CDR) circuits, but may be incorporated into the respective signal quality monitors 14-1 to 14-n. The multiplexer 18 multiplexes the signals of n channels, processed by the discriminators 13-1 to 13-n, into a serial signal (the discriminating function may be incorporated into the multiplexer 18).

Specific embodiments of the invention will be described below with reference to the case where the multi-level modulation receiving device 1 is applied to 2-channel DQPSK reception. There have been proposed a variety of DQPSK schemes such as NRZ (Non Return to Zero)-DQPSK, RZ-DQPSK and CSRZ (Carrier-Suppressed Returned to Zero)-DQPSK, which are classified as such, depending on whether or not the light intensity waveform is shaped into RZ pulses in synchronism with symbols and how the waveform is shaped (in the following, these schemes are generically referred to merely as DQPSK). The multi-level modulation receiving devices described below support all these schemes.

First, a multi-level modulation receiving device according to a first embodiment will be explained, wherein the zero-forcing algorithm is used as the filter weight calculation algorithm. In the first embodiment, the variable parameter values are calculated with respect to all channels and averaged to obtain a weight to be set in the equalizing filters.

Namely, in a generalized form, there are N variable parameters p1 to pN to be set with respect to one equalizing filter. Provided the variable parameter value calculators associated with the channels 1 to n are CH1 to CHn, respectively, the variable parameter value calculator CHk ($1 \leq k \leq n$) calculates N variable parameter values p1 to pN in accordance with the signal quality of the channel k.

Thus, n sets of N variable parameter values p1 to pN are derived, and the variable parameter averaging unit 17 averages the n sets to obtain one averaged set of variable parameter values, which are used as the weights for all equalizing filters.

Figure 11:
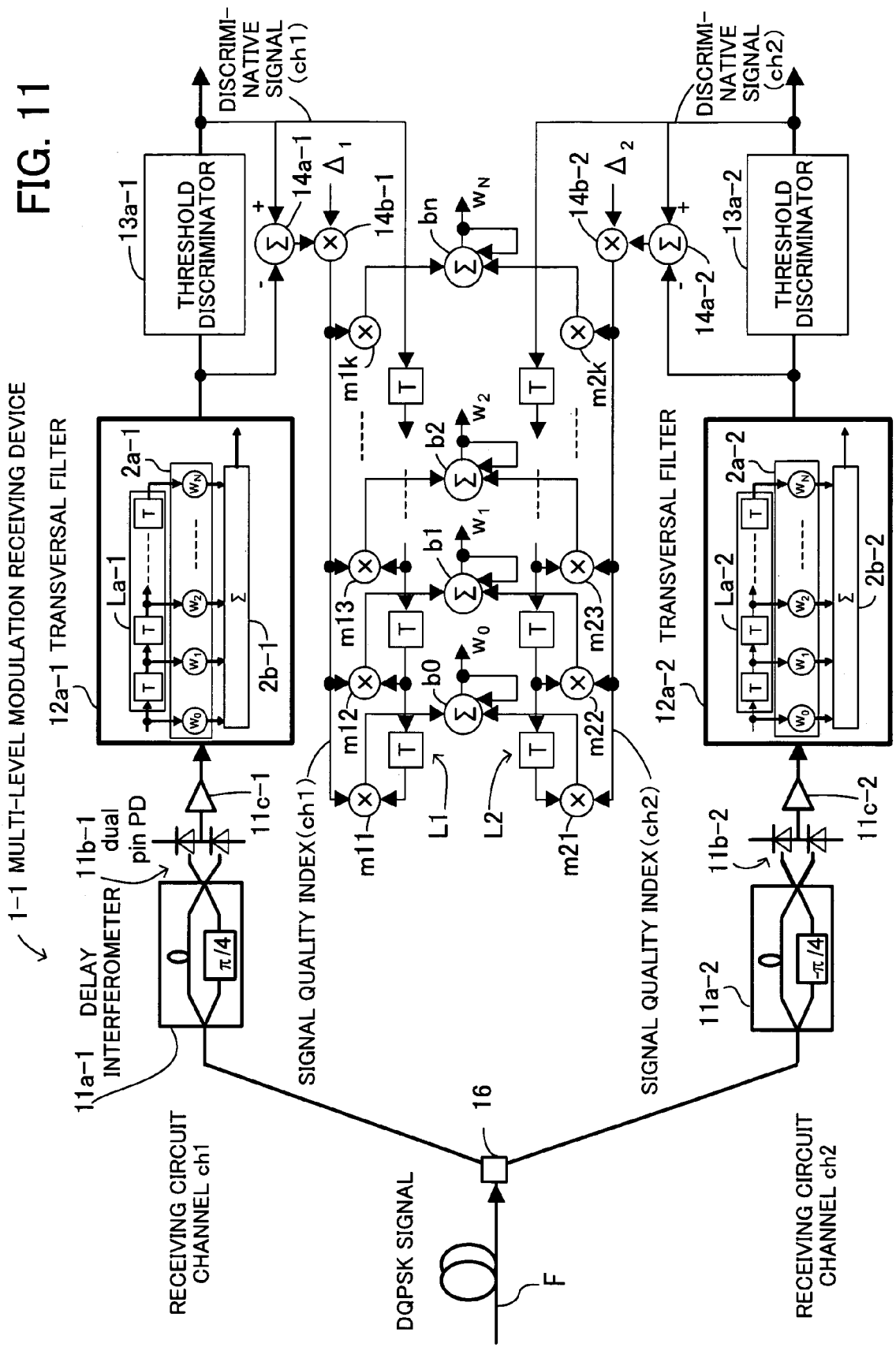
FIG. 11 shows the configuration of a multi-level modulation receiving device.

FIG. 11 shows the configuration of the multi-level modulation receiving device of the first embodiment using the zero-forcing algorithm. A DQPSK optical signal arriving at the multi-level modulation receiving device 1-1 via an optical fiber transmission line F is first split by an optical splitter 16 (1:2 splitter) into two signals, which are supplied to respective receiving circuit channels ch1 and ch2 (corresponding to the equalizers 10-1 and 10-2 in FIG. 1).

A Mach-Zehnder delay interferometer 11a-1, a differential photodiode 11b-1 and a buffer 11c-1, which are similar to those explained above with reference to FIG. 3, are arranged at the front end of the receiving circuit channel ch1. Also, a Mach-Zehnder delay interferometer 11a-2, a differential photodiode 11*b*-2 and a buffer 11*c*-2, which are similar to those explained above with reference to FIG. 3, are arranged at the front end of the receiving circuit channel ch2.

The Mach-Zehnder delay interferometer 11*a*-1, the differential photodiode 11*b*-1 and the buffer 11*c*-1 correspond to the demodulator 11-1 shown in FIG. 1, and the Mach-Zehnder delay interferometer 11*a*-2, the differential photodiode 11*b*-2 and the buffer 11*c*-2 correspond to the demodulator 11-2 in FIG. 1.

The delay interferometers 11*a*-1 and 11*a*-2 have their phase shifts set to +π/4 and −π/4, respectively, so that the respective halves (a-Gbps each) of 2a-Gbps information transmitted at a symbol rate of a-Gbaud are converted to light intensity signals, which are then subjected to photoelectric conversion at the respective differential photodiodes 11*b*-1 and 11*b*-2 (detailed explanation of the operation is already given above and is not repeated here).

The thus-converted electrical signals, each carrying the corresponding 2a-Gbps information, have their waveforms shaped by transversal filters 12*a*-1 and 12*a*-2, respectively, which correspond to the equalizing filters 12-1 and 12-2 shown in FIG. 1, and the resultant signals are input to threshold discriminators 13*a*-1 and 13*a*-2, respectively.

The transversal filter 12*a*-1 is constituted by a delay line La-1, a variable parameter multiplier 2*a*-1 and an adder 2*b*-1, and the transversal filter 12*a*-2 is constituted by a delay line La-2, a variable parameter multiplier 2*a*-2 and an adder 2*b*-2.

The delay line La-1, La-2 taps the input signal from the buffer 11*c*-1, 11*c*-2 each time the signal is delayed for time T. The variable parameter multiplier 2*a*-1, 2*a*-2 multiplies an ith (i=0, . . . , N) tapped component by a weight W1, and the adder 2*b*-1, 2*b*-2 adds up all the components from the corresponding multiplier. By varying the weight (W0, W1, . . . , WN), it is possible to correct the transfer function of the filter.

The threshold discriminators 13*a*-1 and 13*a*-2 correspond to the discriminators 13-1 and 13-2 appearing in FIG. 1. A subtracter 14*a*-1 and a multiplier 14*b*-1 correspond to the signal quality monitor 14-1, and a subtracter 14*a*-2 and a multiplier 14*b*-2 correspond to the signal quality monitor 14-2.

Each of the threshold discriminators 13*a*-1 and 13*a*-2 has clock recovery function and binary discrimination function, and derives an a-GHz clock signal and an a-Gbps binary digital signal from the input analog waveform. Thus, the threshold discriminators output, as the outputs of the receiving circuit channels ch1 and ch2, two a-Gbps signals (2a-Gbps signal as a whole) in parallel with each other (Where a 40-Gbps multi-level modulated optical signal is received, a 20-GHz recovered clock signal and a 20-Gbps binary digital signal are output from each of the threshold discriminators 13*a*-1 and 13*a*-2, and the output signals are multiplexed by the succeeding multiplexer, not shown, to generate 40-Gbps information).

The subtracter 14*a*-1, 14*a*-2 obtains, as an analog value, the difference between the input (filter output signal) and output (discriminative signal) of the threshold discriminator 13*a*-1, 13*a*-2, and the multiplier 14*b*-1, 14*b*-2 multiplies the difference by a gain control constant $\Delta j$ (j denotes the channel number and, in this instance, is 1 or 2), the product obtained being used as a signal quality index.

The result of discrimination by the threshold discriminator 13*a*-1, 13*a*-2 is a binary number, namely, 0 or 1, but the signal input to the threshold discriminator 13*a*-1, 13*a*-2 represents a fraction such as 0.7 or 0.8. Accordingly, the difference between the input and output values of the threshold discriminator serves as an index (signal quality) indicative of the amplitude margin for the input signal relative to the threshold set in the threshold discriminator, and this index is proportional to the eye margin.

In FIG. 11, a delay line L1 and multipliers m11 to m1*k* are functional elements constituting the variable parameter value calculator 15-1 shown in FIG. 1, a delay line L2 and multipliers m21 to m2*k* are functional elements constituting the variable parameter value calculator 15-2, and averaging integrators b0 to bn correspond to the variable parameter averaging unit 17 shown in FIG. 1.

The delay line L1 taps the discriminative signal (ch1), which is the output of the threshold discriminator 13*a*-1, each time the signal is delayed for the time T, and the multipliers m11 to m1*k* each multiply the ith tapped discriminative signal by the signal quality index (ch1), to generate a weight (W10, W11, . . . , W1N) of the receiving circuit channel ch1.

Similarly, the delay line L2 taps the discriminative signal (ch2), which is the output of the threshold discriminator 13*a*-2, each time the signal is delayed for the time T, and the multipliers m21 to m2*k* each multiply the ith tapped discriminative signal by the signal quality index (ch2), to generate a weight (W20, W21, . . . , W2N) of the receiving circuit channel ch2.

The averaging integrators b0 to bn perform time integration on the multiplication results, namely, the weights W10, W11, . . . , W1N and W20, W21, . . . , W2N, thereby calculating averaged weights (W0, W1, . . . , WN) to be set in the transversal filters 12*a*-1 and 12*a*-2.

Thus, using the zero-forcing algorithm, averaged values (W1, W2, . . . , WN) are calculated from the weights (W10, W11, . . . , W1N) of the receiving circuit channel ch1 and the weights (W20, W21, . . . , W2N) of the receiving circuit channel ch2, and are set in the two transversal filters 12*a*-1 and 12*a*-2 as weights.

The multi-level modulation receiving device 1-1 configured as described above provides the following advantages (A) to (C):

(A) Variations/errors of the weights in the steady state can be reduced, and as a result, the quality of the waveforms shaped by the transversal filters 12*a*-1 and 12*a*-2 can be further stabilized.

(B) It is possible to shorten the time required from the time the reception of the multi-level modulated optical signal is started until the weight of the transversal filters 12*a*-1 and 12*a*-2 is stabilized. Consequently, the time needed from the start of signal input to the output of high-quality signal can be shortened.

(C) The dispersion compensation can be made to more quickly follow rapid waveform changes caused in cases where the transfer function of the optical fiber transmission line F suddenly changes with time, for example, where the signal transmission path is switched in accordance with the optical protection switching or where a fiber transmission line with large polarization mode dispersion is moved by the operator.

A multi-level modulation receiving device according to a second embodiment will be now described. In the second embodiment, the multi-level modulation receiving device uses the zero-forcing algorithm and is configured such that, among the weights to be set in the equalizing filters, some are calculated from the receiving circuit channel ch1 while the other weights are calculated from the receiving circuit channel ch2, the calculated values being used in combination to set a common weight in all equalizing filters.

Namely, in a generalized form, there are N variable parameters p1 to pN to be set with respect to one equalizing filter. Provided the variable parameter value calculators associated with the channels 1 to n are CH1 to CHn, respectively, the variable parameter value calculator CHa ($1 \leq a \leq n$) calculates some of the variable parameter values p1 to pN in accordance with the signal quality of the channel a.

On the other hand, the variable parameter value calculator CHb ($1 \leq b \leq n$, $a \neq b$) calculates others of the variable parameter values p1 to pN, not selected by the variable parameter value calculator CHa, in accordance with the signal quality of the channel b.

Thus, in the second embodiment, the N variable parameter values p1 to pN are calculated by the variable parameter value calculators CH1 to CHn in such a manner that the variable parameter value calculation process is allotted among the variable parameter value calculators CH1 to CHn.

Figure 12:
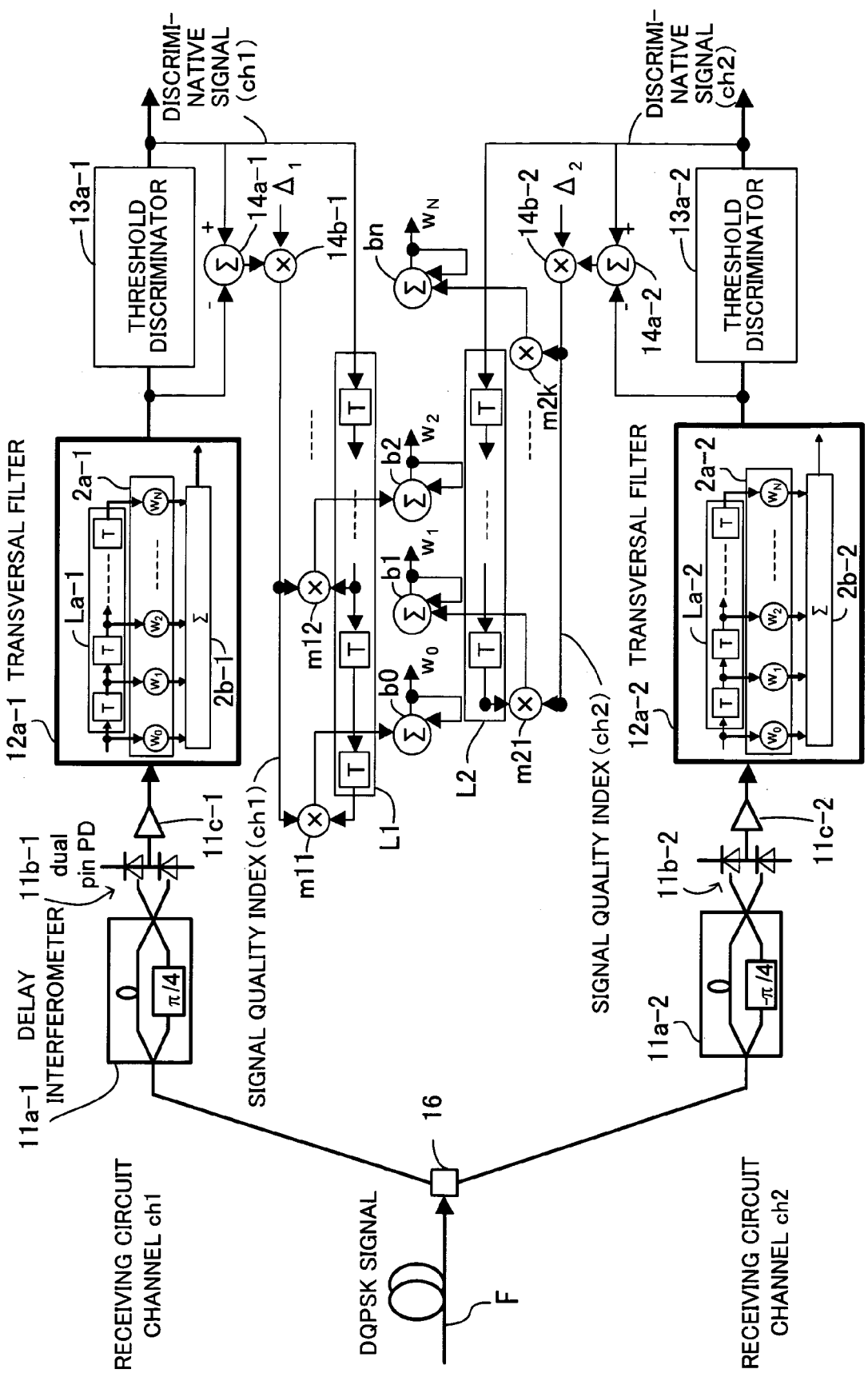
FIG. 12 shows the configuration of another multi-level modulation receiving device.

FIG. 12 shows the configuration of the multi-level modulation receiving device of the second embodiment. The basic configuration of the multi-level modulation receiving device 1-2 is identical with that of the aforementioned multi-level modulation receiving device 1-1 shown in FIG. 11, and accordingly, operation of the device 1-2 different from that of the device 1-1 will be explained below.

To calculate the averaged variable parameter value W0, the signal quality index (ch1) and the discriminative signal (ch1) tapped with a delay are multiplied together by the multiplier m11, and the product obtained is input to the averaging integrator b0, thereby obtaining the averaged variable parameter value W0. The averaged variable parameter value W1 is obtained by multiplying the signal quality index (ch2) and the delayed discriminative signal (ch2) together by the multiplier m21, and inputting the obtained product to the averaging integrator b1.

Also, to calculate the averaged variable parameter value W2, the signal quality index (ch1) and the discriminative signal (ch1) tapped with a delay are multiplied together by the multiplier m12, and the product obtained is input to the averaging integrator b2, thereby obtaining the averaged variable parameter value W2. Similarly, the averaged variable parameter value WN is obtained by multiplying the signal quality index (ch2) and the delayed discriminative signal (ch2) together by the multiplier m2k, and inputting the obtained product to the averaging integrator bn.

Thus, in the second embodiment, calculation of the weights to be set in the equalizing filters is allotted among the multiple variable parameter value calculators associated with the respective receiving circuit channels. Accordingly, this embodiment provides not only the aforementioned advantages (A) to (C) but the advantage that the scale of circuitry and the power consumption can be reduced, compared with the configuration shown in FIG. 11.

The following describes the configuration and operation of a 2-channel DQPSK multi-level modulation receiving device according to a third embodiment, which uses the least mean square error algorithm as the filter weight calculation algorithm. In the multi-level modulation receiving device of the third embodiment, the weights to be set in the equalizing filters are calculated with respect to all channels and are averaged.

Figure 13:
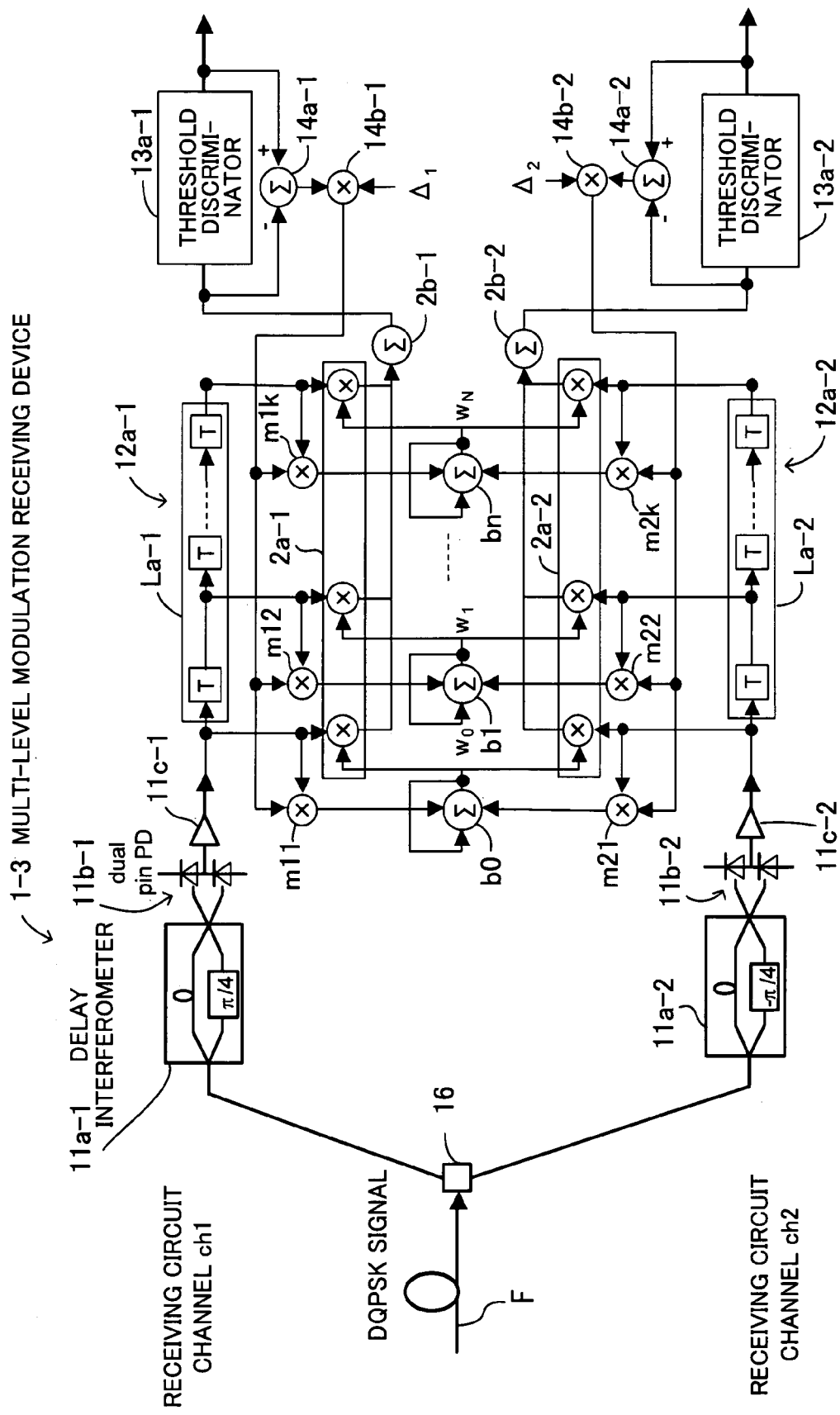
FIG. 13 shows the configuration of still another multi-level modulation receiving device.

FIG. 13 shows the configuration of the multi-level modulation receiving device of the third embodiment. In the multi-level modulation receiving device 1-3 using the least mean square error algorithm, a DQPSK optical signal arriving via an optical fiber transmission line F is first split by an optical splitter 16 (1:2 splitter) into two signals, which are supplied to respective receiving circuit channels ch1 and ch2 (corresponding to the equalizers 10-1 and 10-2 in FIG. 1).

A Mach-Zehnder delay interferometer 11a-1, a differential photodiode 11b-1 and a buffer 11c-1, which are similar to those explained above with reference to FIG. 3, are arranged at the front end of the receiving circuit channel ch1. Also, a Mach-Zehnder delay interferometer 11a-2, a differential photodiode 11b-2 and a buffer 11c-2, which are similar to those explained above with reference to FIG. 3, are arranged at the front end of the receiving circuit channel ch2.

The Mach-Zehnder delay interferometer 11a-1, the differential photodiode 11b-1 and the buffer 11c-1 correspond to the demodulator 11-1 shown in FIG. 1, and the Mach-Zehnder delay interferometer 11a-2, the differential photodiode 11b-2 and the buffer 11c-2 correspond to the demodulator 11-2 in FIG. 1.

The electrical signals output to the buffers 11c-1 and 11c-2 after being subjected to photoelectric conversion have their waveforms shaped by transversal filters 12a-1 and 12a-2, respectively, which correspond to the equalizing filters 12-1 and 12-2 shown in FIG. 1, and the resultant signals are input to threshold discriminators 13a-1 and 13a-2, respectively.

The transversal filter 12a-1 is constituted by a delay line La-1, a variable parameter multiplier 2a-1 and an adder 2b-1, and the transversal filter 12a-2 is constituted by a delay line La-2, a variable parameter multiplier 2a-2 and an adder 2b-2.

The delay line La-1, La-2 taps the input signal each time the signal is delayed for time T. The variable parameter multiplier 2a-1, 2a-2 multiplies an ith (i=0, . . . , N) tapped component by a weight W1, and the adder 2b-1, 2b-2 adds up all the components from the corresponding multiplier. By varying the weight (W0, W1, . . . , WN), it is possible to correct the transfer function of the filter.

The threshold discriminators 13a-1 and 13a-2 correspond to the discriminators 13-1 and 13-2 appearing in FIG. 1. A subtracter 14a-1 and a multiplier 14b-1 correspond to the signal quality monitor 14-1, and a subtracter 14a-2 and a multiplier 14b-2 correspond to the signal quality monitor 14-2.

The subtracter 14a-1, 14a-2 obtains, as an analog value, the difference between the input (filter output signal) and output (discriminative signal) of the threshold discriminator 13a-1, 13a-2, and the multiplier 14b-1, 14b-2 multiplies the difference by the gain control constant $\Delta j$ to generate a signal quality index.

In FIG. 13, multipliers m11 to m1k are functional elements constituting the variable parameter value calculator 15-1 shown in FIG. 1, multipliers m21 to m2k are functional elements constituting the variable parameter value calculator 15-2, and averaging integrators b0 to bn correspond to the variable parameter averaging unit 17 shown in FIG. 1.

In the transversal filter 12a-1, the delay line La-1 taps the input signal each time the signal is delayed for the time T, and the multipliers m11 to m1k each multiply the ith tapped signal by the signal quality index (ch1), to generate a weight (W10, W11, . . . , W1N) of the receiving circuit channel ch1.

Also, in the transversal filter 12a-2, the delay line La-2 taps the input signal each time the signal is delayed for the time T, and the multipliers m21 to m2k each multiply the ith tapped signal by the signal quality index (ch2), to generate a weight (W20, W21, . . . , W2N) of the receiving circuit channel ch2.

The averaging integrators b0 to bn perform time integration on the multiplication results, namely, the weights W10, W11, . . . , W1N and W20, W21, . . . , W2N, thereby calculating weights (W0, W1, . . . , WN) to be set in the transversal filters 12a-1 and 12a-2.

The first and second embodiments adopt feedback control wherein the weights are calculated by multiplying the discriminative signals, which have been subjected to the threshold discrimination, by the signal quality indices. In the third embodiment, on the other hand, feedforward control is carried out in such a manner that the signals which are tapped in the transversal filters and not yet subjected to the threshold discrimination are multiplied by the signal quality indices to obtain the weights.

Figure 14:
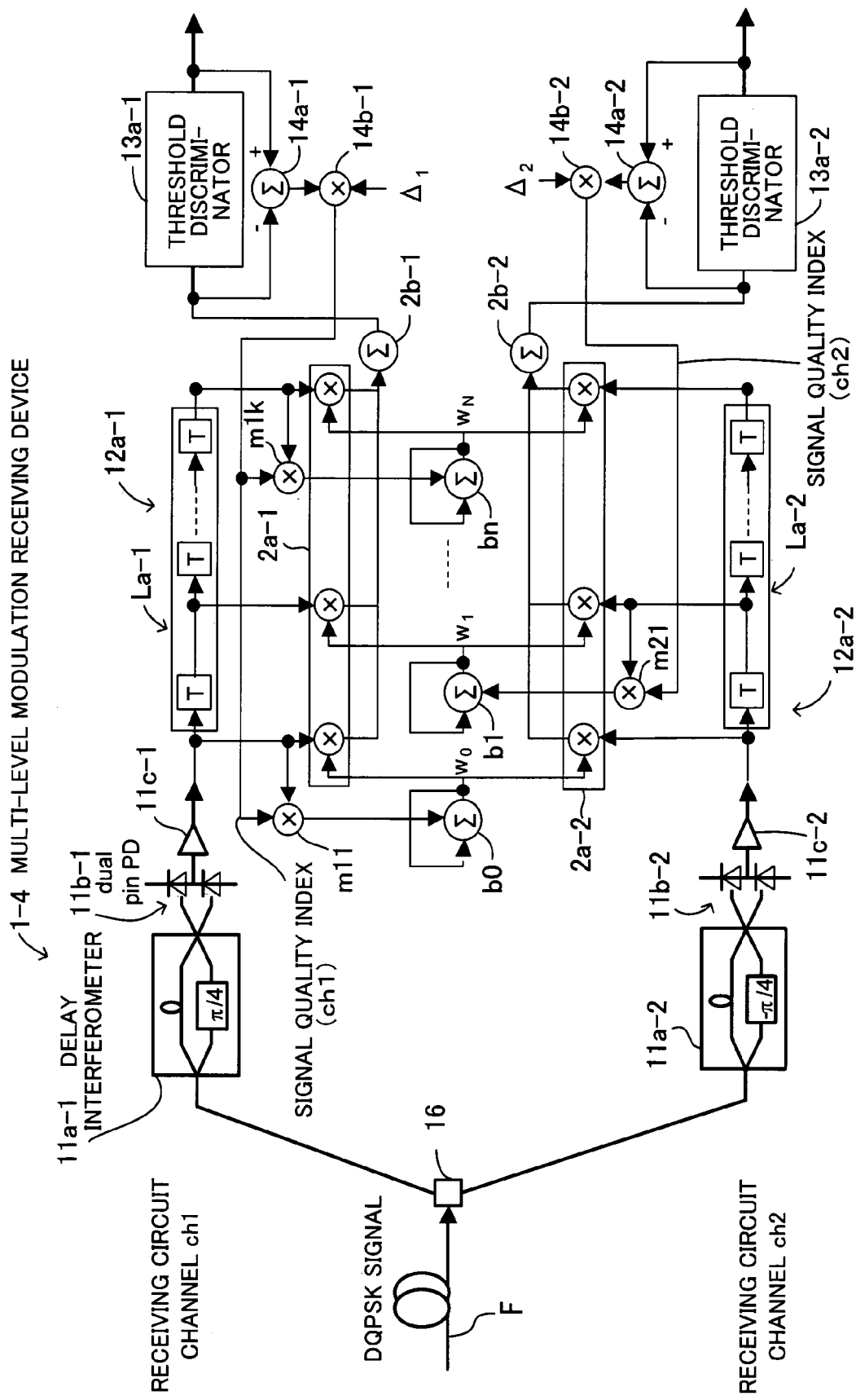
FIG. 14 shows the configuration of yet another multi-level modulation receiving device.

FIG. 14 shows the configuration of a multi-level modulation receiving device according to a fourth embodiment. In the fourth embodiment, the multi-level modulation receiving device 1-4 uses the least mean square error algorithm and is configured such that, among the weights to be set in the equalizing filters, some are calculated from the receiving circuit channel ch1 while the other weights are calculated from the receiving circuit channel ch2, the calculated values being used in combination to set a common weight in all equalizing filters. The basic configuration of the multi-level modulation receiving device 1-4 is identical with that of the aforementioned multi-level modulation receiving device 1-3 shown in FIG. 13, and accordingly, operation of the device 1-4 different from that of the device 1-3 will be explained below.

To calculate the averaged variable parameter value W0, the signal quality index (ch1) and the tapped signal delayed by the delay line La-1 in the transversal filter 12a-1 are multiplied together by the multiplier m11, and the product obtained is input to the averaging integrator b0, thereby obtaining the averaged variable parameter value W0.

Also, to calculate the averaged variable parameter value W1, the signal quality index (ch2) and the tapped signal delayed by the delay line La-2 in the transversal filter 12a-2 are multiplied together by the multiplier m21, and the product obtained is input to the averaging integrator b1, thereby obtaining the averaged variable parameter value W1.

Further, to calculate the averaged variable parameter value WN, the signal quality index (ch1) and the tapped signal delayed by the delay line La-1 in the transversal filter 12a-1 are multiplied together by the multiplier m1k, and the product obtained is input to the averaging integrator bn, thereby obtaining the averaged variable parameter value WN.

Thus, in the fourth embodiment, calculation of the weights to be set in the equalizing filters is allotted between the variable parameter value calculators associated with the receiving circuit channels ch1 and ch2. Accordingly, this embodiment provides not only the aforementioned advantages (A) to (C) but the advantage that the scale of circuitry and the power consumption can be reduced, compared with the configuration shown in FIG. 13.

Figure 15:
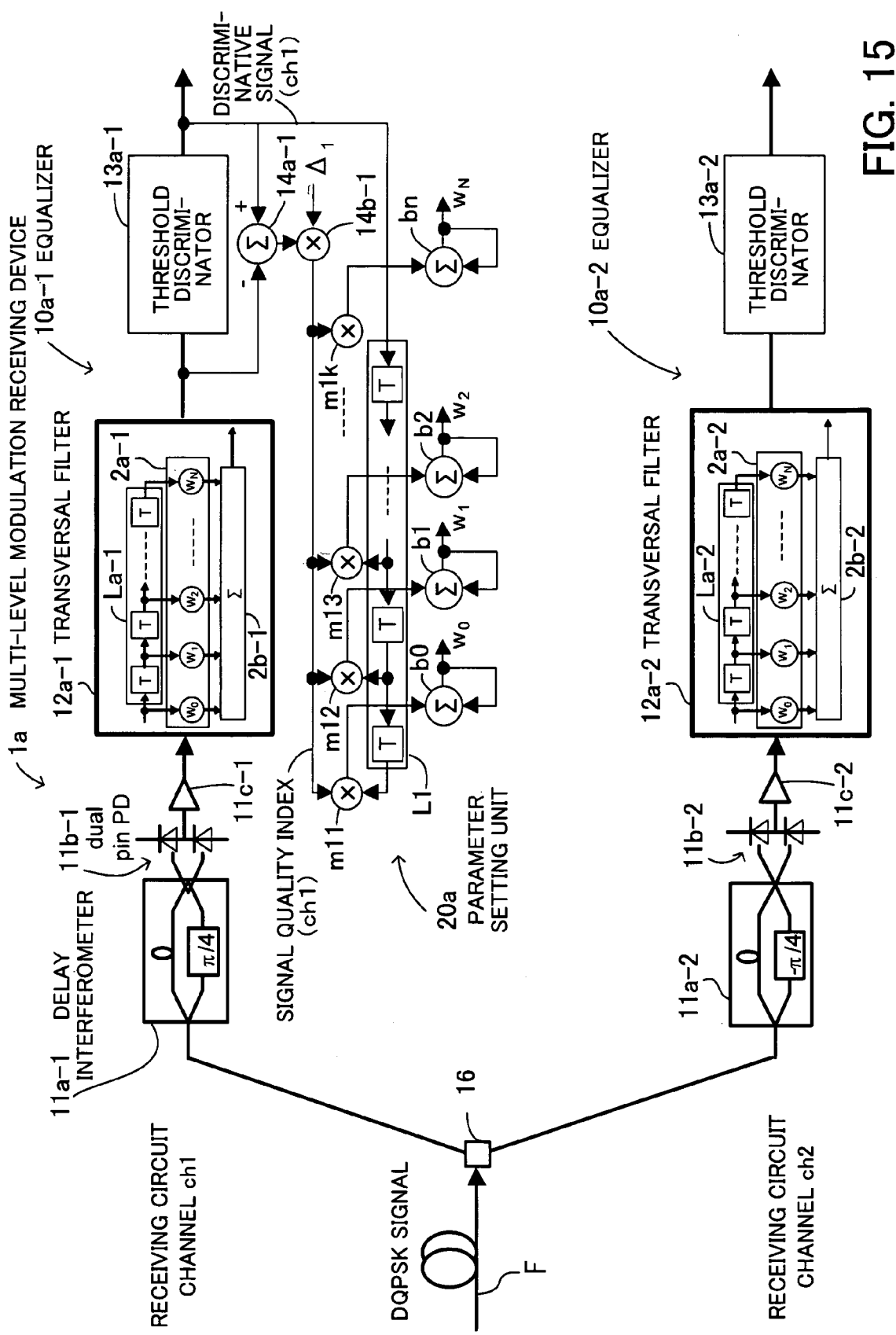
FIG. 15 shows the configuration of a multi-level modulation receiving device according to a modification.

Modifications of the multi-level modulation receiving device will be now described. FIG. 15 shows the configuration of a multi-level modulation receiving device 1a, which is a modification of the multi-level modulation receiving device 1-1 shown in FIG. 11. The multi-level modulation receiving device 1a comprises equalizers 10a-1 and 10a-2, and a parameter setting unit 20a.

The equalizer 10a-1 is constituted by a delay interferometer 11a-1, a differential photodiode 11b-1, a buffer 11c-1, a transversal filter 12a-1, and a threshold discriminator 13a-1. The delay interferometer 11a-1, the differential photodiode 11b-1 and the buffer 11c-1 correspond to the demodulator 11-1 shown in FIG. 1, the transversal filter 12a-1 corresponds to the equalizing filter 12-1 in FIG. 1, and the threshold discriminator 13a-1 corresponds to the discriminator 13-1 in FIG. 1.

Similarly, the equalizer 10a-2 is constituted by a delay interferometer 11a-2, a differential photodiode 11b-2, a buffer 11c-2, a transversal filter 12a-2, and a threshold discriminator 13a-2. The delay interferometer 11a-2, the differential photodiode 11b-2 and the buffer 11c-2 correspond to the demodulator 11-2 shown in FIG. 1, the transversal filter 12a-2 corresponds to the equalizing filter 12-2 in FIG. 1, and the threshold discriminator 13a-2 corresponds to the discriminator 13-2 in FIG. 1.

The parameter setting unit 20a is constituted by a subtracter 14a-1, a multiplier 14b-1, a delay line L1, multipliers m11 to m1k, and averaging integrators b0 to bn. The subtracter 14a-1 and the multiplier 14b-1 correspond to the signal quality monitor 14-1 shown in FIG. 1, the delay line L1 and the multipliers m11 to m1k correspond to the variable parameter value calculator 15-1 in FIG. 1, and the averaging integrators b0 to bn correspond to the variable parameter averaging unit 17 in FIG. 1.

In the multi-level modulation receiving device 1-1 shown in FIG. 11, the signal quality monitor, which includes a subtracter and a multiplier, and the variable parameter value calculator, which includes multipliers and a delay line, are provided for each channel, and weights are acquired from the multiple channels and are averaged by the variable parameter averaging unit 17 including the averaging integrators b0 to bn.

On the other hand, in the multi-level modulation receiving device 1a shown in FIG. 15, the signal quality monitor, which includes the subtracter 14a-1 and the multiplier 14b-1, and the variable parameter value calculator, which includes the multipliers m11 to m1k and the delay line L1, are provided for one channel only. Weights are derived from the only one channel and are averaged by the variable parameter averaging unit including the averaging integrators b0 to bn, and the averaged value is set in all transversal filters 12a-1 and 12a-2 (in other respects, the configuration and operation of the device 1a are identical with those of the counterpart shown in FIG. 11, and therefore, description thereof is omitted).

In FIG. 15, the parameter setting unit 20a is associated with the receiving circuit channel ch1, but may alternatively be associated with the receiving circuit channel ch2. Thus, the parameter setting unit is provided for only a desired one of the receiving circuit channels, and weights are derived from the only one channel and are set in all equalizing filters, whereby not only the aforementioned advantages (A) to (C) can be achieved but also the scale of circuitry as well as the power consumption can be reduced.

Figure 16:
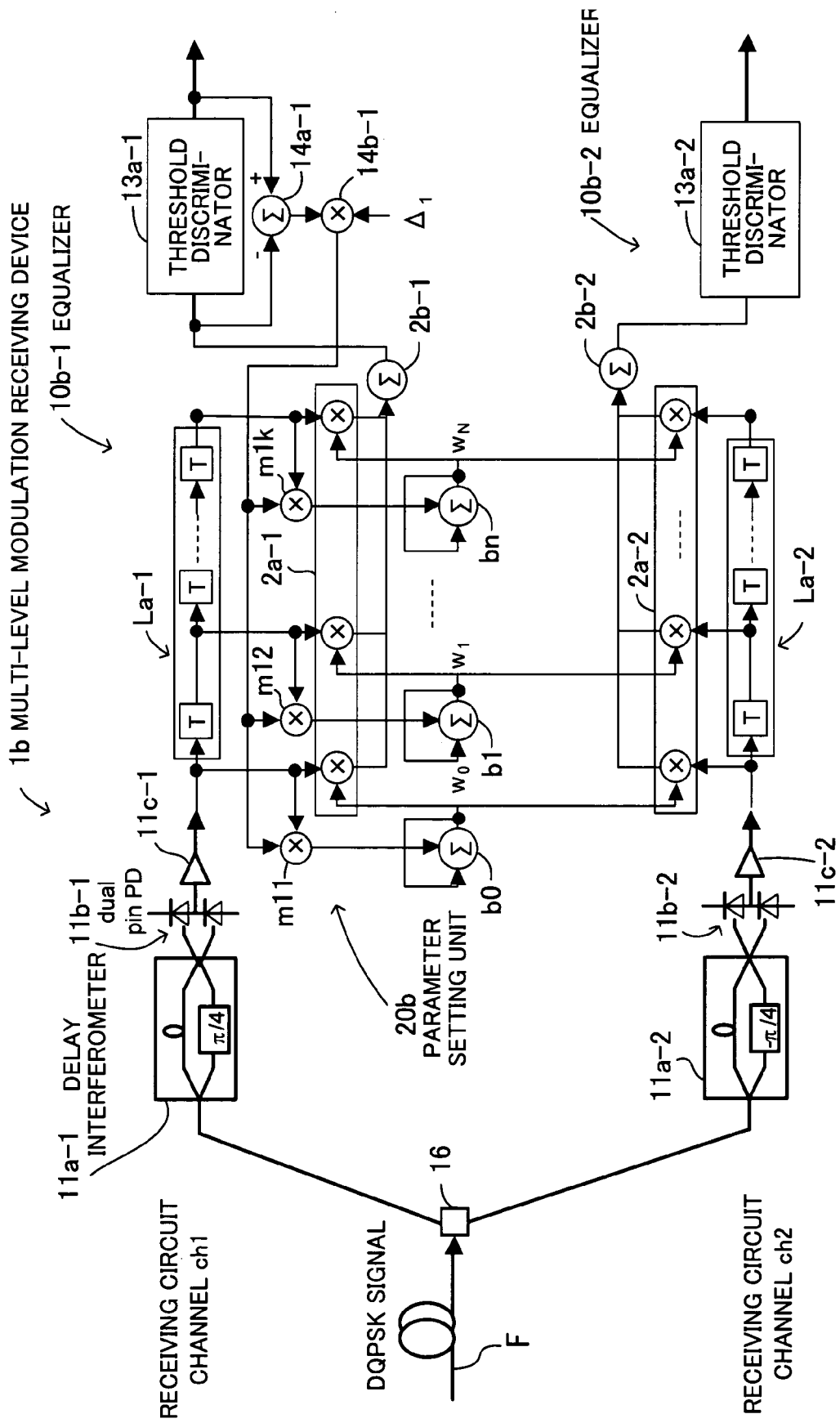
FIG. 16 shows the configuration of a multi-level modulation receiving device according to another modification.

FIG. 16 shows the configuration of a multi-level modulation receiving device 1b, which is a modification of the multi-level modulation receiving device 1-3 shown in FIG. 13. The multi-level modulation receiving device 1b comprises equalizers 10b-1 and 10b-2, and a parameter setting unit 20b.

The equalizer 10b-1 is constituted by a delay interferometer 11a-1, a differential photodiode 11b-1, a buffer 11c-1, a transversal filter 12a-1, and a threshold discriminator 13a-1. The transversal filter 12a-1 includes a delay line La-1, a variable parameter multiplier 2a-1, and an adder 2b-1.

The delay interferometer 11a-1, the differential photodiode 11b-1 and the buffer 11c-1 correspond to the demodulator 11-1 shown in FIG. 1, the transversal filter 12a-1 corresponds to the equalizing filter 12-1 in FIG. 1, and the threshold discriminator 13a-1 corresponds to the discriminator 13-1 in FIG. 1.

The equalizer 10b-2 is constituted by a delay interferometer 11a-2, a differential photodiode 11b-2, a buffer 11c-2, a transversal filter 12a-2, and a threshold discriminator 13a-2. The transversal filter 12a-2 includes a delay line La-2, a variable parameter multiplier 2a-2, and an adder 2b-2.

The delay interferometer 11a-2, the differential photodiode 11b-2 and the buffer 11c-2 correspond to the demodulator 11-2 shown in FIG. 1, the transversal filter 12a-2 corresponds to the equalizing filter 12-2 in FIG. 1, and the threshold discriminator 13a-2 corresponds to the discriminator 13-2 in FIG. 1.

The parameter setting unit 20b is constituted by a subtracter 14a-1, a multiplier 14b-1, multipliers m11 to m1k, and averaging integrators b0 to bn. The subtracter 14a-1 and the multiplier 14b-1 correspond to the signal quality monitor 14-1 shown in FIG. 1, the multipliers m11 to m1k correspond to the variable parameter value calculator 15-1 in FIG. 1, and the averaging integrators b0 to bn correspond to the variable parameter averaging unit 17 in FIG. 1.

In the multi-level modulation receiving device 1-3 shown in FIG. 13, the signal quality monitor, which includes a subtracter and a multiplier, and the variable parameter value calculator, which includes multipliers, are provided for each channel, and weights are acquired from the multiple channels and are averaged by the variable parameter averaging unit 17 including the averaging integrators b0 to bn. On the other hand, in the multi-level modulation receiving device 1b shown in FIG. 16, the variable parameter value calculator including the multipliers m11 to m1k is provided for one channel only. Weights are derived from the only one channel and are averaged by the variable parameter averaging unit including the averaging integrators b0 to bn, and the averaged value is set in all transversal filters 12a-1 and 12a-2 (in other respects, the configuration and operation of the device 1b are identical with those of the counterpart shown in FIG. 13, and therefore, description thereof is omitted).

In FIG. 16, the parameter setting unit 20b is associated with the receiving circuit channel ch1, but may be associated with the receiving circuit channel ch2 instead. Thus, the parameter setting unit is provided for only a desired one of the receiving circuit channels, and weights are derived from the only one channel and are set for all equalizing filters, whereby not only the aforementioned advantages (A) to (C) can be achieved but also the scale of circuitry and the power consumption can be reduced.

In the multi-level modulation receiving device of the present invention, variable parameter values calculated with respect to n channels are averaged to generate an averaged variable parameter value, which is sent to the equalizing filters associated with the n channels so that the same weight may be set in the equalizing filters. This enables the variable parameter set values to converge quickly. Further, the dispersion compensation can be made to quickly follow changes in chromatic dispersion and polarization mode dispersion caused on the optical fiber transmission line, and thus waveform degradation can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multi-level modulation receiving device for receiving a multi-level modulated optical signal, comprising:
   an optical splitter for receiving a multi-level modulated optical signal transmitted thereto via a transmission line, and splitting the multi-level modulated optical signal into n optical signals;
   equalizers associated with n channels, respectively, each of the equalizers including a demodulator for demodulating a corresponding channel of the split optical signal and converting the optical signal to an electrical channel signal, an equalizing filter having at least one variable parameter as a weight therefor, for equalizing waveform of the channel signal in accordance with an averaged variable parameter value, a discriminator for discriminating a waveform-equalized filter output signal output from the equalizing filter, a signal quality monitor for monitoring signal quality of the filter output signal, and a variable parameter value calculator for calculating a variable parameter value to be set as the variable parameter, in accordance with the signal quality; and
   a variable parameter averaging unit for averaging the variable parameter values calculated for the respective channels, to generate the averaged variable parameter value, and sending the averaged variable parameter value to the equalizing filters such that an identical weight is set in the equalizing filters associated with the n channels.

2. The multi-level modulation receiving device according to claim 1, wherein the variable parameter includes N variable parameters p1 to pN to be set with respect to each of the equalizing filters, and provided that the variable parameter value calculators associated with the channels 1 to n are CH1 to CHn, respectively, the variable parameter value calculator CHk ($1 \leq k \leq n$) calculates values of the N variable parameters p1 to pN in accordance with the signal quality of the channel k.

3. The multi-level modulation receiving device according to claim 1, wherein the variable parameter includes N variable parameters p1 to pN to be set with respect to each of the equalizing filters, and provided that the variable parameter value calculators associated with the channels 1 to n are CH1 to CHn, respectively, the variable parameter value calculator CHa ($1 \leq a \leq n$) calculates some values of the N variable parameters p1 to pN in accordance with the signal quality of the channel a and the variable parameter value calculator CHb ($1 \leq b \leq n$, $a \neq b$) calculates other values of the N variable parameters p1 to pN, not selected by the variable parameter value calculator CHa, in accordance with the signal quality of the channel b so that all values of the N variable parameters p1 to pN may be calculated in a manner such that calculations of the N variable parameters are allotted to the variable parameter value calculators CH1 to CHn.

4. The multi-level modulation receiving device according to claim 1, wherein the signal quality monitor obtains a difference between the filter output signal and a discriminative signal output from the discriminator and multiplies the difference by a gain control constant to generate a signal quality index as the signal quality, and the variable parameter value calculator generates a delay of unit time to successively delay the discriminative signal and multiplies the delayed discriminative signal by the signal quality index to calculate the variable parameter value.

5. The multi-level modulation receiving device according to claim 1, wherein the signal quality monitor obtains a difference between the filter output signal and a discriminative signal output from the discriminator and multiplies the difference by a gain control constant to generate a signal quality index as the signal quality, the equalizing filter generates a delay of unit time to successively delay the channel signal, and the variable parameter value calculator multiplies the delayed channel signal by the signal quality index to calculate the variable parameter value.

6. A multi-level modulation receiving device for receiving a multi-level modulated optical signal, comprising:
   an optical splitter for receiving a multi-level modulated optical signal transmitted thereto via a transmission line, and splitting the multi-level modulated optical signal into n optical signals;

equalizers associated with n channels, respectively, each of the equalizers including a demodulator for demodulating a corresponding channel of the split optical signal and converting the optical signal to an electrical channel signal, an equalizing filter having at least one variable parameter as a weight therefor, for equalizing waveform of the channel signal in accordance with an averaged variable parameter value, and a discriminator for discriminating a waveform-equalized filter output signal output from the equalizing filter; and a parameter setting unit associated with only one of the n channels, the parameter setting unit including a signal quality monitor for monitoring signal quality of the corresponding filter output signal, a variable parameter value calculator for calculating variable parameter values to be set as the variable parameter, in accordance with the signal quality, and a variable parameter averaging unit for averaging the variable parameter values calculated for the only one channel, to generate the averaged variable parameter value, and sending the averaged variable parameter value to the equalizing filters such that an identical weight is set in all of the equalizing filters associated with the n channels.

7. The multi-level modulation receiving device according to claim 6, wherein the signal quality monitor obtains a difference between the filter output signal and a discriminative signal output from the discriminator and multiplies the difference by a gain control constant to generate a signal quality index as the signal quality, and the variable parameter value calculator generates a delay of unit time to successively delay the discriminative signal and multiplies the delayed discriminative signal by the signal quality index to calculate the variable parameter value.

8. The multi-level modulation receiving device according to claim 6, wherein the signal quality monitor obtains a difference between the filter output signal and a discriminative signal output from the discriminator and multiplies the difference by a gain control constant to generate a signal quality index as the signal quality, the equalizing filter generates a delay of unit time to successively delay the channel signal, and the variable parameter value calculator multiplies the delayed channel signal by the signal quality index to calculate the variable parameter value.

* * * * *